(12) United States Patent
Hamada

(10) Patent No.: US 8,693,851 B2
(45) Date of Patent: Apr. 8, 2014

(54) REPRODUCTION APPARATUS, REPRODUCTION METHOD, RECORDING METHOD, PROGRAM AND DATA STRUCTURE

(75) Inventor: Toshiya Hamada, Saitama (JP)

(73) Assignee: Sony Corporation, Tokyo (JP)

( * ) Notice: Subject to any disclaimer, the term of this patent is extended or adjusted under 35 U.S.C. 154(b) by 136 days.

(21) Appl. No.: 13/203,349

(22) PCT Filed: Mar. 3, 2010

(86) PCT No.: PCT/JP2010/053424
§ 371 (c)(1),
(2), (4) Date: Aug. 25, 2011

(87) PCT Pub. No.: WO2010/103969
PCT Pub. Date: Sep. 16, 2010

(65) Prior Publication Data
US 2011/0305429 A1    Dec. 15, 2011

(30) Foreign Application Priority Data

Mar. 10, 2009    (JP) .................................. 2009-056267

(51) Int. Cl.
*H04N 5/93* (2006.01)
*H04N 5/782* (2006.01)

(52) U.S. Cl.
USPC .......................................... 386/357; 386/324

(58) Field of Classification Search
USPC ................. 386/357, 353, 354, 324, 323, 248
See application file for complete search history.

(56) References Cited

U.S. PATENT DOCUMENTS 6,925,250 B1    8/2005  Oshima et al.
7,606,474 B2 *  10/2009 Fukuda et al. ................ 386/248
2008/0101767 A1  5/2008  Oshima et al.

FOREIGN PATENT DOCUMENTS

| CN | 1739291 A | 2/2006 |
|---|---|---|
| CN | 1866378 A | 11/2006 |
| JP | 11 191895 | 7/1999 |
| WO | WO 2008/156318 A2 | 12/2008 |
| WO | WO 2009/002115 A2 | 12/2008 |
| WO | 2009 133714 | 11/2009 |

OTHER PUBLICATIONS

International Standard, ISO/IEC 14496-12, "Information Technology—Coding of Audio-Visual Objects—Part 12: ISO Base Media File Format", Second Addition (Apr. 1, 2005), Corrected Version (Oct. 1, 2005), Total 94 Pages.

(Continued)

*Primary Examiner* — Robert Chevalier
(74) *Attorney, Agent, or Firm* — Oblon, Spivak, McClelland, Maier & Neustadt, L.L.P.

(57) ABSTRACT

Disclosed are a reproduction apparatus, a reproduction method, a recording apparatus, a recording method, a program and a data structure which can rapidly read a plurality of files from a recording medium at the same time. A reproduction apparatus 22 continuously reads interleaved data from a disc 21 which records a file of an ISO base media file format. The file includes interleaved data which is physically and continuously recorded on the disc 21 by dividing each data stream of files B and D into interleave units and by interleaving the interleave units, and position information which indicates, using the interleave unit as a chunk of the ISO base media file format, the position of the interleave unit which forms the chunk. Further, the reproduction apparatus 22 de-interleaves the interleaved data into the interleave units of each of the files B and D, on the basis of the position information.

13 Claims, 22 Drawing Sheets

(56) References Cited

OTHER PUBLICATIONS

International Search Report Issued Jun. 1, 2010 in PCT/JP10/053424 filed Mar. 3, 2010.

Combined Office Action and Search Report issued Sep. 11, 2013 in Chinese Application No. 201080010399.1 (With English Translation).

* cited by examiner

FIG.16

| DATA UNIT IN ISO BASE MEDIA FILE FORMAT | NEW FILE MANAGEMENT METHOD |
|---|---|
| 1 track | 1 FILE TO BE INTERLEAVED |
| 1 chunk | DIVISION UNIT OF FILE (1 INTERLEAVE UNIT) |
| 1 sample | DATA IN WHICH 1 GOP OF VIDEO IS INCLUDED (WHICH FORMS SAMPLE INCLUDING MULTIPLEXED AUDIO WITH REFERENCE TO VIDEO) |

REPRODUCTION APPARATUS, REPRODUCTION METHOD, RECORDING METHOD, PROGRAM AND DATA STRUCTURE

TECHNICAL FIELD

The present invention relates to a reproduction apparatus, a reproduction method, a recording apparatus, a recording method, a program and a data structure, and in particular, to a reproduction apparatus, a reproduction method, a recording apparatus, a recording method, a program and a data structure which can rapidly read data streams of a plurality of files from a recording medium at the same time.

BACKGROUND ART

For example, as image (video image) content such as movies, two-dimensional image content is mainly used, but recently, stereoscopic vision image content capable of being stereoscopically viewed has attracted attention.

In order to display the stereoscopic vision images, a dedicated device (hereinafter, referred to as a "stereoscopic vision device") is required. As such a stereoscopic vision device, for example, there is an IP (Integral Photography) stereoscopic image system developed by NHK (Japan Broadcasting Corporation).

Image data on the stereoscopic vision images includes image data having a plurality of viewpoints (image data on images taken from a plurality of viewpoints). In this regard, it is possible to realize so-called "multi-directional TV" in which an object can be viewed in various directions as the number of the viewpoints is large and the viewpoint covers a wide range.

A stereoscopic vision image having the lowest viewpoint number among the stereoscopic vision images corresponds to a stereoscopic image (so-called 3D image) having two viewpoints. The image data on the stereoscopic image includes image data on an image (hereinafter, referred to as a "left eye image") observed by the left eye and image data on an image (hereinafter referred to as a "right eye image") observed by the right eye.

On the other hand, since high definition image content such as movies has a large volume, a recording medium with a large capacity is required in order to record such image content having a large volume.

As such a recording medium having a large capacity, for example, there is a Blu-Ray® Disc (hereinafter, referred to as "BD") such as a BD (Blu-Ray®)-ROM (Read Only Memory) (refer to NPL 1).

CITATION LIST

Non Patent Literature

[NPL 1] BD-ROM Part 3-1 specification

SUMMARY OF INVENTION

Technical Problem

However, a method of recording or reproducing the image data on the stereoscopic vision image including the stereoscopic image in the BD is not defined in the BD specification.

For ease of description, with respect to the stereoscopic image among the stereoscopic vision images, the image data of the stereoscopic image includes two data streams including the image data on the left eye image and the image data on the right eye image, as described above.

If two data streams of the left eye image and the right eye image are not appropriately recorded on the BD, reading of the data stream of the stereoscopic image content may not be performed in time for reproduction of the stereoscopic image.

That is, the reading rate when the data stream is read out from the BD has an upper limit due to a rotation number of a drive which drives the BD (rotation number in which the BD is rotated), an access time including a seek time or the like, a data transmission speed from the drive, or the like.

Accordingly, for example, if one of two data streams of the left eye image and the right eye image is recorded on the BD and then the other is recorded, the seek is frequently generated, and thus, the reading of the data stream may not be performed in time for reproduction.

Thus, for example, a method of multiplexing two data streams of the left eye image and the right eye image, and of recording the result on the BD as one TS (Transport Stream) file, is considered.

However, the bit rate of one TS has an upper limit due to performance of a de-multiplexer, a decoder or the like which processes the TS. Accordingly, when two data streams are multiplexed into one TS, the bit rate of each data stream should be a low bit rate. Thus, the image quality of the stereoscopic image deteriorates.

The present invention has been made in view of solving the above-described problems, and is to provide a technique which can rapidly read data streams of a plurality of files from a recording medium such as a BD, at the same time (when visible).

Solution to Problem

According to a first aspect of the present invention, there is provided a reproduction apparatus or a program which causes a computer to function as the reproduction apparatus. The reproduction apparatus includes: a reading control section which performs a reading control for continuously reading interleaved data from a recording medium which records a file of an ISO base media file format, the file including the interleaved data which is obtained by dividing each data stream of a plurality of files recorded on the recording medium into interleave units which are fragments of the data stream and by interleaving the interleave units of the data streams of the plurality of files and which is physically and continuously recorded on the recording medium, and position information which indicates, using the interleave unit as a chunk of the ISO base media file format, the position of the interleave unit which forms the chunk, on the interleaved data; an obtaining section which obtains the position information from the recording medium; and a de-interleaving control section which performs a de-interleaving control for de-interleaving the interleaved data into the interleave units of each of the data streams of the plurality of files on the basis of the position information and re-forming each of the data streams of the plurality of files which includes the interleave units.

A reproduction method according to the first aspect of the present invention includes the steps of: performing a reading control for continuously reading interleaved data from a recording medium which records a file of an ISO base media file format, the file including the interleaved data which is obtained by dividing each data stream of a plurality of files recorded on the recording medium into interleave units which are fragments of the data stream and by interleaving the interleave units of the data streams of the plurality of files and which is physically and continuously recorded on the recording medium, and position information which indicates, using the interleave unit as a chunk of the ISO base media file format, the position of the interleave unit which forms the chunk, on the interleaved data; obtaining the position information from the recording medium; and performing a de-interleaving control for de-interleaving the interleaved data into the interleave units of each of the data streams of the plurality of files on the basis of the position information and re-forming each of the data streams of the plurality of files which includes the interleave units.

According to the above-described first aspect, the interleaved data is continuously read from the recording medium which records the file of the ISO base media file format, the file including the interleaved data which is obtained by dividing each of the data streams of the plurality of files recorded on the recording medium into the interleave units which are the fragments of the data stream and by interleaving the interleave units of the data streams of the plurality of files and which is physically and continuously recorded on the recording medium, and the position information which indicates, using the interleave unit as the chunk of the ISO base media file format, the position of the interleave unit which forms the chunk, on the interleaved data. Further, the position information is obtained from the recording medium. Further the interleaved data is de-interleaved into the interleave units of each of the data streams of the plurality of files on the basis of the position information, and each of the data streams of the plurality of files which includes the interleave units is re-formed.

According to a second aspect of the present invention, there is provided a recording apparatus or a program which causes a computer to function as the recording apparatus. The recording apparatus includes: an interleaving section which generates interleaved data which is physically and continuously recorded on a recording medium by dividing each data stream of a plurality of files recorded on the recording medium into interleave units which are fragments of the data stream and by interleaving the interleave units of the data streams of the plurality of files; a generating section which generates position information which indicates, using the interleave unit as a chunk of the ISO base media file format, the position of the interleave unit which forms the chunk, on the interleaved data; and a recording control section which performs a recording control for physically and continuously recording the interleaved data on the recording medium using the interleaved data and the position information as one file of the ISO base media file format and for recording the position information on the recording medium.

A recording method according to the second aspect of the present invention includes the steps of: generating interleaved data which is physically and continuously recorded on a recording medium by dividing each data stream of a plurality of files recorded on the recording medium into interleave units which are fragments of the data stream and by interleaving the interleave units of the data streams of the plurality of files; generating position information which indicates, using the interleave unit as a chunk of the ISO base media file format, the position of the interleave unit which forms the chunk, on the interleaved data; and performing a recording control for physically and continuously recording the interleaved data on the recording medium using the interleaved data and the position information as one file of the ISO base media file format and for recording the position information on the recording medium.

According to the above-described second aspect, the interleaved data is generated which is physically and continuously recorded on a recording medium, by dividing each of the data streams of the plurality of files recorded on the recording medium into the interleave units which are the fragments of the data stream and by interleaving the interleave units of the data streams of the plurality of files. Further, the position information is generated which indicates, using the interleave unit as the chunk of the ISO base media file format, the position of the interleave unit which forms the chunk, on the interleaved data. Further, the interleaved data is physically and continuously recorded on the recording medium using the interleaved data and the position information as one file of the ISO base media file format, and the position information is recorded on the recording medium.

According to a third aspect of the present invention, there is provided a data structure of a file of an ISO base media file format, the file including: interleaved data which is obtained by dividing each data stream of a plurality of files recorded on the recording medium into interleave units which are fragments of the data stream and by interleaving the interleave units of the data streams of the plurality of files and which is physically and continuously recorded on the recording medium; and position information which indicates, using the interleave unit as a chunk of the ISO base media file format, the position of the interleave unit which forms the chunk, on the interleaved data.

According to the above-described third aspect, in the file of the ISO base media file format are included: interleaved data which is obtained by dividing each data stream of a plurality of files recorded on the recording medium into interleave units which are fragments of the data stream and by interleaving the interleave units of the data streams of the plurality of files and which is physically and continuously recorded on the recording medium; and position information which indicates, using the interleave unit as a chunk of the ISO base media file format, the position of the interleave unit which forms the chunk, on the interleaved data.

Here, each of the reproduction apparatus and the recording apparatus may be a separate apparatus, or may be an internal block which forms a single apparatus.

Further, the programs and the data of the data structure, as described above, may be transmitted through a transmission medium, or may be provided while being recorded on the recording medium.

Advantageous Effects of Invention

According to the first to third aspects of the present invention, it is possible to rapidly read the plurality of files from the recording medium at the same time.

BRIEF DESCRIPTION OF DRAWINGS

FIG. 16 is a diagram illustrating a target allocated to each unit of data of an ISO base media file format in a new file management method.

DESCRIPTION OF EMBODIMENTS

[Recording and Reproduction of Stereoscopic Image using AnnexE of BD-ROM Part 3-1 Specification]

Hereinafter, embodiments of the present invention will be described. Firstly, recording and reproduction of image data (data stream) on a stereoscopic image using arrangement of a plurality of data streams for multi angles defined in AnnexE of the BD-ROM Part 3-1 specification will be described.

Figure 1:
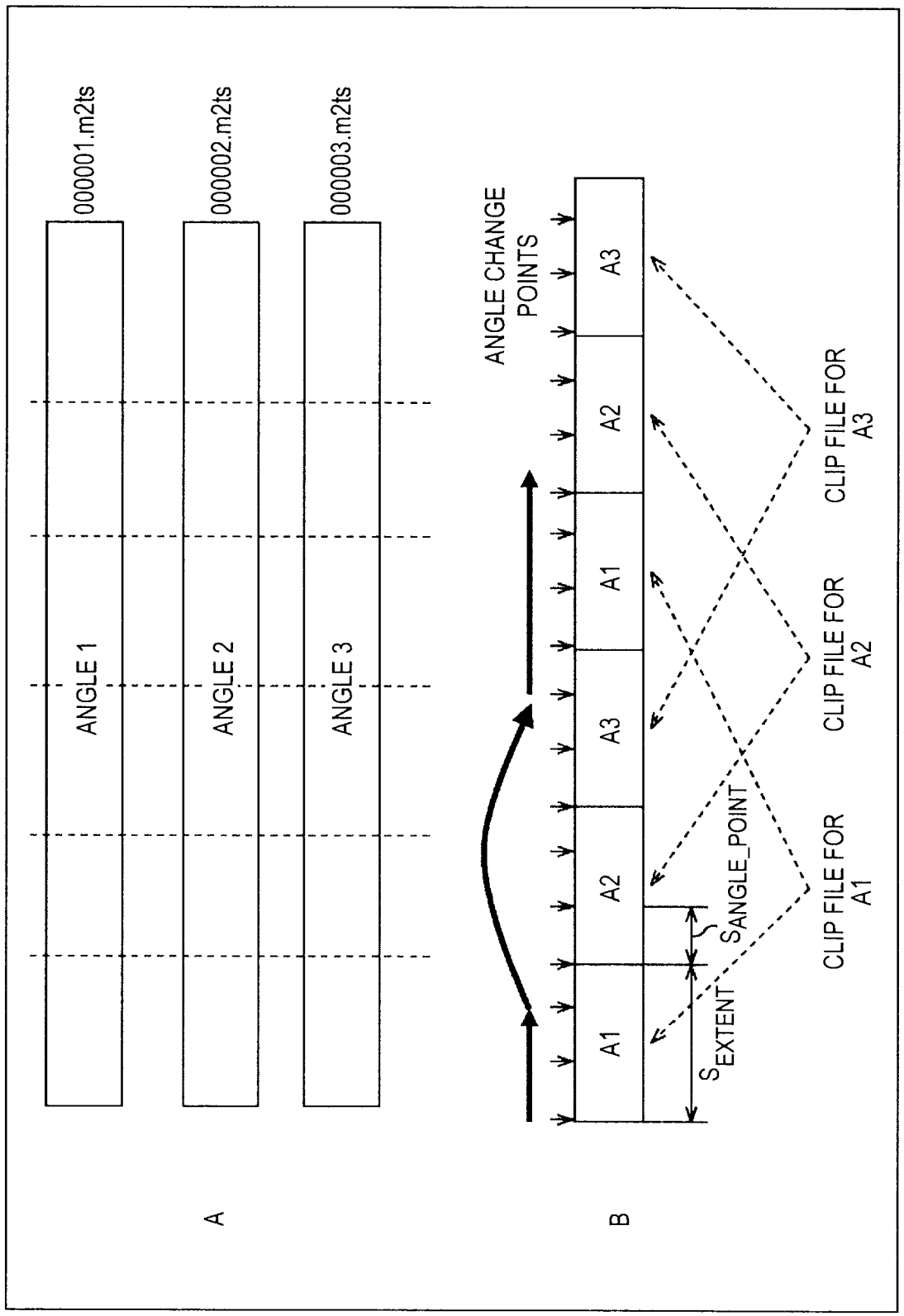
FIG. 1 is a diagram illustrating arrangement of a plurality of data streams for multi angles defined in AnnexE of a BD-ROM Part 3-1 specification.

FIG. 1 is a diagram illustrating arrangement of a plurality of data streams for multi angles defined in AnnexE of the BD-ROM Part 3-1 specification.

That is, "A" in FIG. 1 represents a TS file based on MPEG (Moving Picture Experts Group) 2 of images captured at three different angles A1, A2 and A3.

In "A" of FIG. 1, a file name of a TS file of the image at the first angle A1 is "00001.m2ts". Further, a file name of a TS file of the image at the second angle A2 is "00002.m2ts", and a file name of a TS file of the image at the third angle A3 is "00003.m2ts", respectively.

"B" in FIG. 1 represents arrangement of three TS files on a BD in "A" of FIG. 1.

In "B" of FIG. 1, a data stream of each of the TS files at three angles A1, A2 and A3 is divided into fragments of a predetermined size $S_{EXTENT}$. Further, the data streams of the respective TS files at three angles A1, A2 and A3 are interleaved in such an order of a fragment of the angle A1, a fragment of the angle A2, a fragment of the angle A3, a fragment of the angle A1, and so on, and physically and continuously recorded on the BD.

In "B" of FIG. 1, an "I" picture is present in a position indicated by angle change points. Switching of the angles can be performed at a timing of the angle change points. (It is possible to jump from a certain angle change point to another angle change point).

Further, in "B" of FIG. 1, $S_{ANGLE\_POINT}$ represents an interval between adjacent angle change points.

Figure 2:
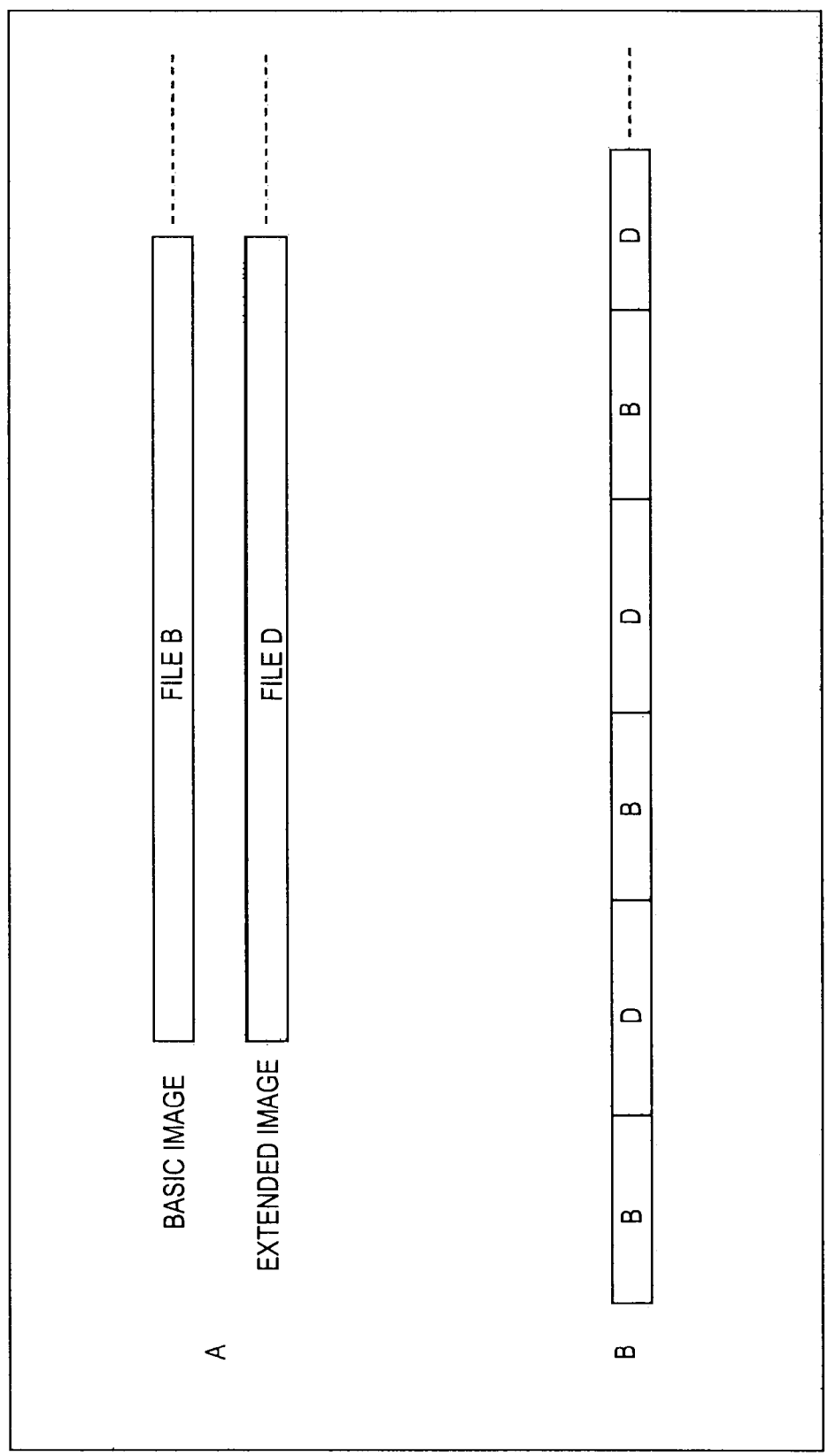
FIG. 2 is a diagram illustrating recording of image data on a stereoscopic image which uses arrangement of a plurality of data streams for multi angles defined in AnnexE of a BD-ROM Part 3-1 specification.

FIG. 2 is a diagram illustrating recording of image data on a stereoscopic image using arrangement of a plurality of data streams for multi angles defined in AnnexE of the BD-ROM Part 3-1 specification shown in FIG. 1.

That is, "A" in FIG. 2 represents a base image (base view) and an extended image (extended view).

A data stream file of image data of a left eye image of a stereoscopic image and a data stream file of image data of a right eye image can be recorded on the BD, for example, by using one of the files of the left eye image and the right eye image as a file "B" of the base image and by using the other one thereof as a file "D" of the extended image.

Here, in a case where a reproduction apparatus which reproduces the BD can reproduce the stereoscopic image (hereinafter, also referred to as a "corresponding reproduction apparatus"), it is possible to reproduce both the base image and the extended image, that is, the left eye image and the right eye image from the BD, and to display the stereoscopic image including the left eye image and the right eye image.

On the other hand, in a case where the reproduction apparatus which reproduces the BD cannot reproduce the stereoscopic image (hereinafter, also referred to as a "non-corresponding reproduction apparatus), for example, the base image among the base image and the extended image, that is, one of the left eye image and the right eye image is reproduced from the BD, and a two dimensional image which is the base image is displayed.

"B" in FIG. 2 represents arrangement of a file B of the base image and a file D of the extended image on the BD.

A data stream of the file B of the base image and a data stream of the file D of the extended image are divided into fragments of a predetermined size, in a similar way to the case in FIG. 1, and are interleaved in such an order of a fragment of the file B, a fragment of the file D, a fragment of the file B, and so on, and physically and continuously recorded on the BD.

Figure 3:
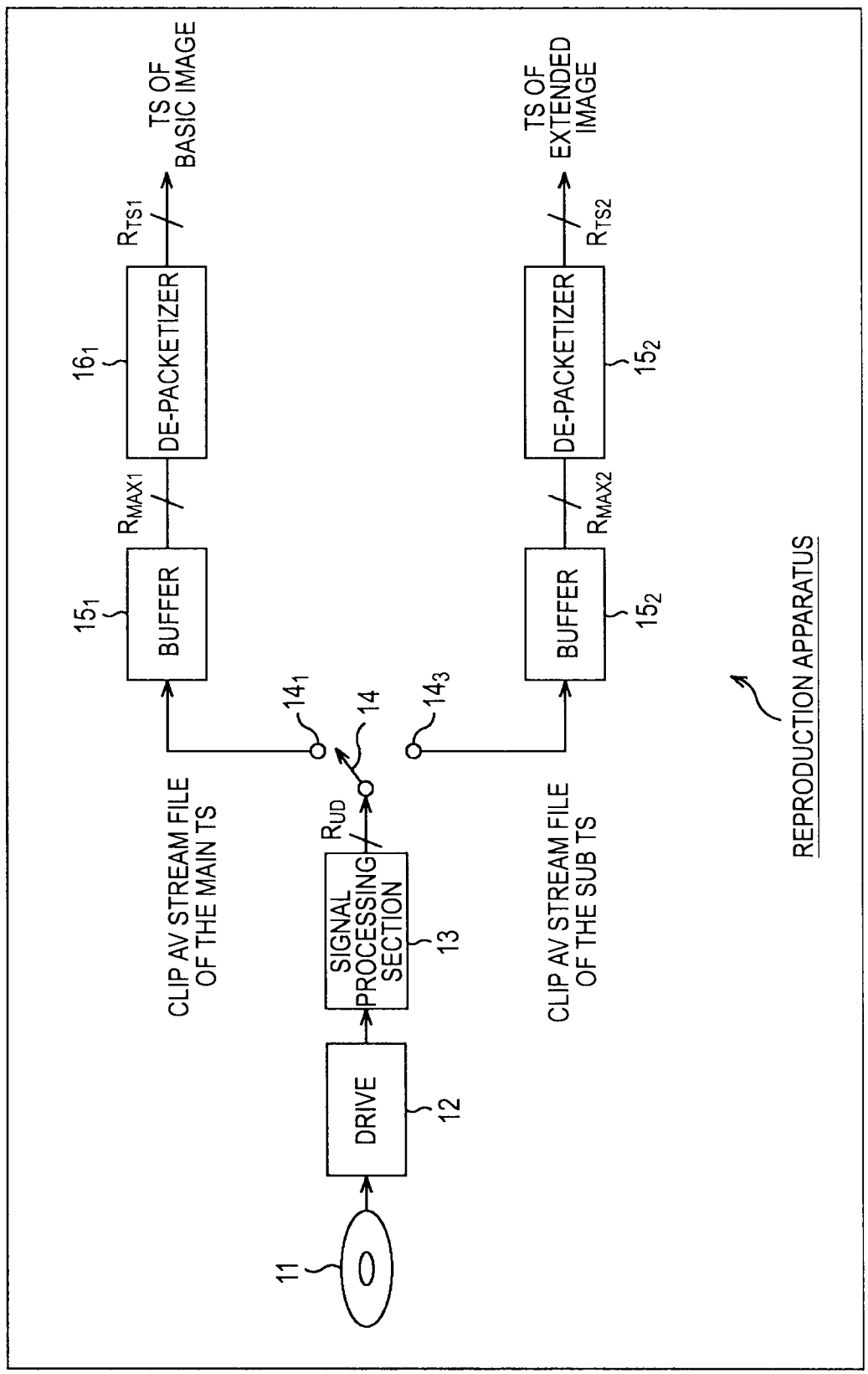
FIG. 3 is a block diagram illustrating a configuration example of a corresponding reproduction apparatus which reproduces a BD on which a stereoscopic image is recorded.

FIG. 3 is a block diagram illustrating a configuration example of the corresponding reproduction apparatus which reproduces the BD on which the stereoscopic image is recorded, as described in FIG. 2.

For example, a disc 11 is the BD, and the file B of the base image and the file D of the extended image are recorded thereon, as described in FIG. 2.

The disc 11 is detachably installed in a drive 12. The drive 12 reads the data streams of the files B and D from the installed disc 11, and supplies the read data streams to a signal processing section 13.

The signal processing section 12 performs a signal processing such as a demodulation process or an error checking and correction (ECC decoding) with respect to the data streams from the drive 12, and supplies a data stream $R_{UD}$ obtained as the result to a switch 14.

The switch 14 appropriately selects a terminal $14_1$ connected to a buffer $15_1$ and a terminal $14_2$ connected to a buffer $15_2$, and then supplies the data stream $R_{UD}$ from the signal processing section 12 to the selected terminal.

That is, the switch 14 selects the terminal $14_1$ at a timing when the data stream (fragment) of the file B is supplied as the data stream $R_{UD}$ from the signal processing section 13. Thus, the data stream of the file B is supplied to the buffer $15_1$ from the switch 14 as a data stream $R_{MAX1}$.

Further, the switch 14 selects the terminal $14_2$ at a timing when the data stream (fragment) of the file ID is supplied as the data stream $R_{UD}$ from the signal processing section 13. Thus, the data stream of the file ID is supplied to the buffer $15_2$ from the switch 14 as a data stream $R_{MAX2}$.

The buffer $15_1$ temporarily stores the data stream $R_{MAX1}$ of the file B supplied through the terminal $14_1$ from the switch 14, and supplies the result to a (source) de-packetizer $16_1$.

The buffer $15_2$ temporarily stores the data stream $R_{mAx2}$ of the file D supplied through the terminal $14_2$ from the switch 14, and supplies the result to a de-packetizer $16_2$.

The source de-packetizer $16_1$ deletes a header included in the data stream $R_{MAX1}$ of the file B from the buffer $15_1$, and then outputs a TS data stream $R_{TS1}$ of the base image which is formed by a TS packet of 188 bytes obtained as the result.

That is, the data stream of the file of the image read from the disc 11 which is the BD is a data stream of a packet in which a header of 4 bytes is added to the TS packet of 188 bytes. The de-packetizer $16_1$ deletes the header of 4 bytes from the data streams of the packet in which the header of 4 bytes is added to the TS packet of 188 bytes, and forms the data stream $R_{TS1}$ of the TS packet of 188 bytes for output.

In a similar way to the de-packetizer $16_1$, the de-packetizer $16_2$ deletes a header included in the data stream $R_{MAX2}$ of the file D from the buffer $15_2$, and then outputs a TS data stream $R_{TS2}$ of the extended image which is formed by a TS packet of 188 bytes obtained as the result.

However, at the multi angles, only one image at a certain angle is necessary each time. Thus, it is assumed that the number of files read from the BD at the same time is only one, in AnnexE based on BD-ROM Part 3-1 specification.

Further, in order to read a file in the reproduction apparatus of the BD, it is necessary to issue a reading command of a reading target file to a file system.

Accordingly, in the corresponding reproduction apparatus shown in FIG. 3, as indicated by "B" in FIG. 2, in order to read the file B of the base image and the file D of the extended image from the disc 11 in which the fragments of the data stream of the file B of the base image and the fragments of the data stream of the file D of the extended image are interleaved and physically and continuously recorded thereon, it is necessary to alternately issue a reading command of the file B and a reading command of the file D for each fragment.

Figure 4:
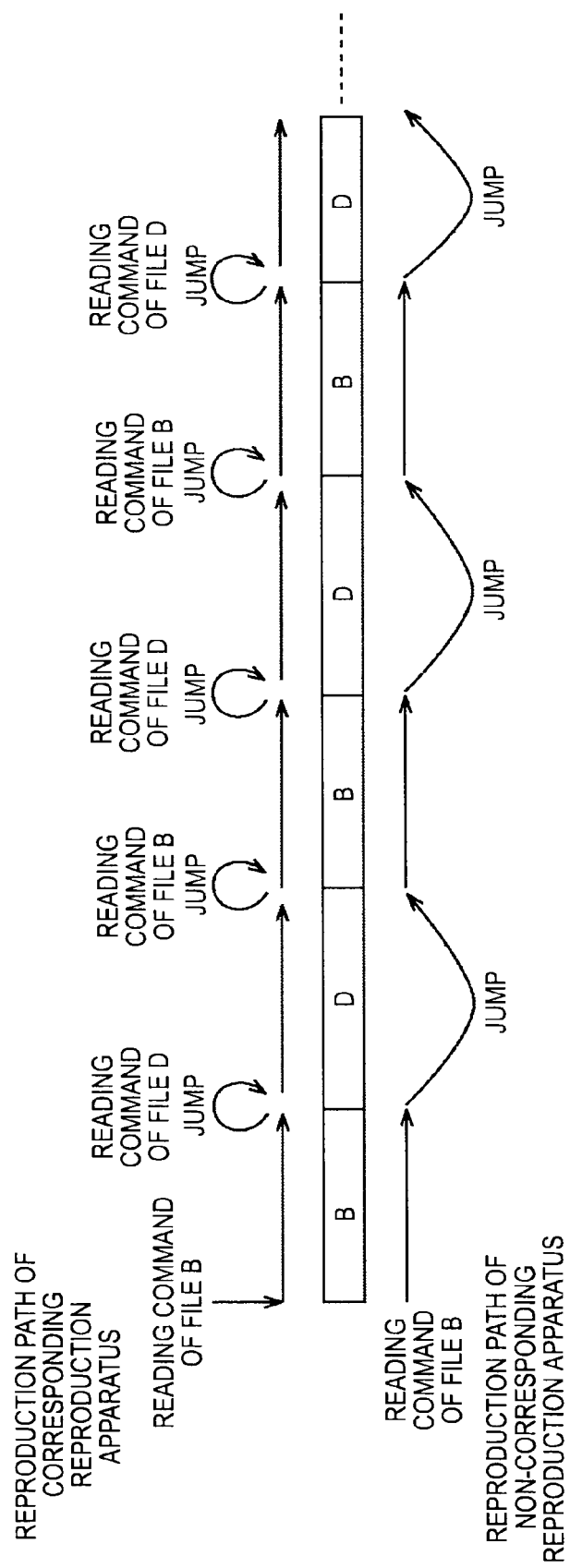
FIG. 4 is a diagram illustrating reading of a data stream from a disc 11.

That is, FIG. 4 is a diagram illustrating reading of the data stream from the disc 11.

Here, as indicated by "B" of FIG. 2, the data stream in which the fragments of the data stream of the file B of the base image and the fragments of the data stream of the file D of the extended image are interleaved is referred to as "interleaved data".

In the non-corresponding reproduction apparatus, the reading command of the file B of the base image is issued, and then, the interleaved data which is physically and continuously recorded on the disc 11 is read while jumping the fragments of the data stream of the file D of the extended image. Thus, in the non-corresponding reproduction apparatus, only the fragments of the data stream of the file B of the base image are read.

On the other hand, in the corresponding reproduction apparatus, all the interleaved data which is physically and continuously recorded on the disc 11 is read.

Here, it is necessary that the corresponding reproduction apparatus issues the reading command of the file B, when reading the fragments of the data stream of the file B of the base image among the interleaved data, and the corresponding reproduction apparatus issues the reading command of the file D when reading the fragments of the data stream of the file D of the extended image.

Thus, even though the interleaved data is physically and continuously recorded on the disc 11, overhead is incurred in which the reading command should be issued between the fragments of the data stream of the file B of the base image and the fragments of the data stream of the file D of the extended image when reading the interleaved data.

As a result, when a reading target is switched from one of the fragments of the data stream of the file B of the base image and the fragments of the data stream of the file D of the extended image to the other thereof, at least rotational delay of the time necessary for one rotation of the disc 11 occurs.

As described above, when AnnexE based on BD-ROM Part 3-1 specification is used as it is in recording of the stereoscopic image, the rotation delay occurs, and thus, reading of the files B and D may not be performed in time for reproduction of the stereoscopic image.

[Description of New File Management Method]

According to the present invention, reading of the interleaved data and the data streams of the plurality of files are rapidly performed by performing file management for the interleaved data by the following new method (hereinafter, referred to as a "new file management method").

Figure 5:
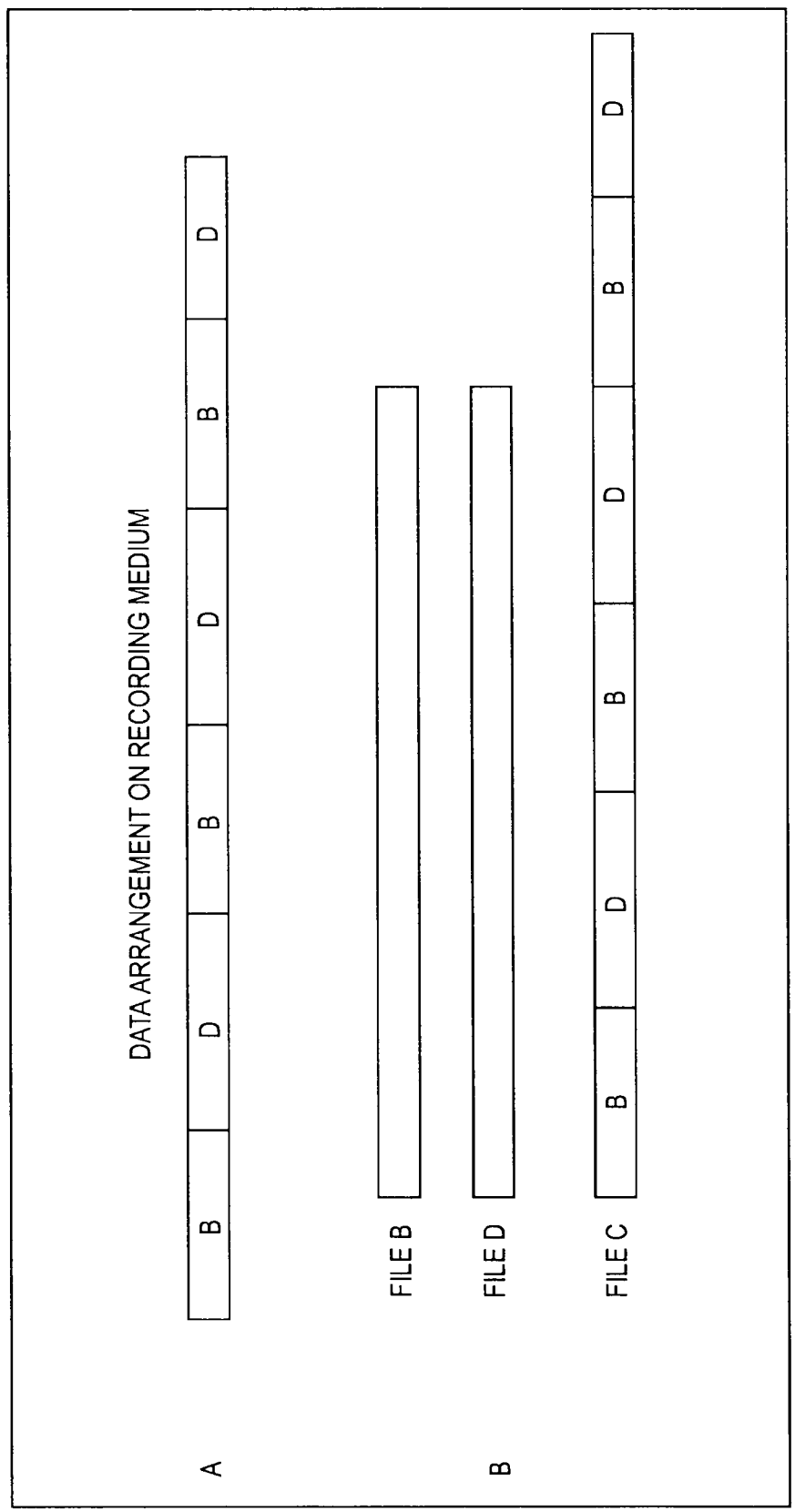
FIG. 5 is a diagram illustrating the outline of a new file management method.

FIG. 5 is a diagram illustrating the outline of the new file management method.

In the new file management method, the interleaved data obtained by dividing each of the data streams of the files B and D which are the plurality of files recorded on a recording medium such as a BD into interleave units which are fragments of the data streams and by interleaving the interleave units of the data streams of the files B and D, is physically and continuously recorded on the BD.

"A" in FIG. 5 represents the physical arrangement of the interleaved data on the BD.

The respective interleave units of the files B and D are alternately and physically arranged (recorded) on the BD.

In the new file management method, in addition to the files B and D which form the interleaved data and respectively store the interleave units of the files B and D, a file C which stores the interleaved data is provided.

"B" in FIG. 5 represents a file which is present (appears to be present) on the BD, in the new file management method.

In the new file management method, in addition to file B of the base image and the file D of the extended image, the file C which stores the interleaved data appears to be present on the BD, in the file system.

Here, in the new file management method, the interleaved data is shared between the files B, D and C. That is, the interleave units of the data stream of the image data on the base image are shared by the files B and C, and the interleave units of the data stream of the image data on the extended data are shared by the files D and C.

The above-described data (data stream) sharing can be realized by applying a link function (function called hard link, symbolic link or the like) provided by a file system called UDF (OSTA Universal Disk Format®) or a file system such as UNIX (registered trademark) or other OSs (operating system), and by sharing a region where data is actually recorded on the recording medium between a plurality of files.

In the new file management method, it is possible to access the interleaved data including the data stream of file B of the base image and the data stream of the file D of the extended image, as a data stream of the file C.

Accordingly, in the new file management method, it is possible to read the interleaved data only by issuing a reading command of the file C.

Figure 6:
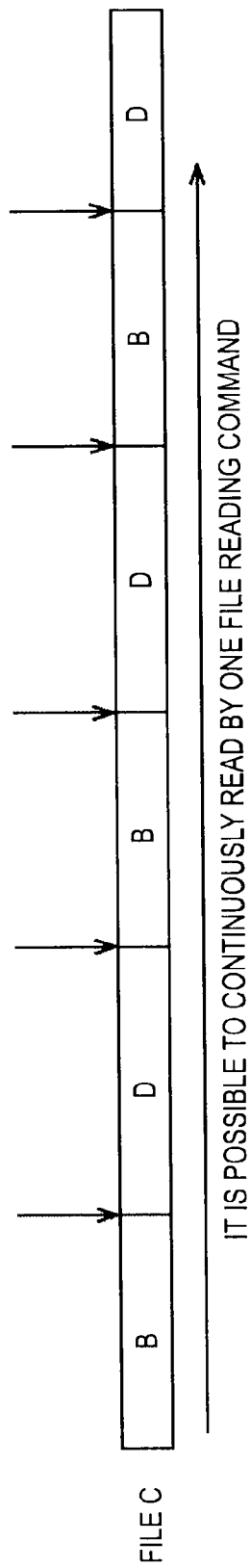
FIG. 6 is a diagram illustrating reading of interleaved data in a new file management method.

That is, FIG. 6 is a diagram illustrating reading of the interleaved data in the new file management method.

In the new file management method, since the interleaved data is read as the data on the file C, without being read as the data (interleave units) on the file B and the data on the file D, the reading command of the file C has only to be issued as a reading command.

Accordingly, as described with reference to FIG. 4, compared with the case where the reading command of the file B and the reading command of the file D are alternately issued, it is possible to rapidly read the interleaved data, that is, the data streams of the files B and D.

As described above, by using the link function of the file system and by handling the interleaved data as the data stream of the file C, it is possible to rapidly read the data streams of the files B and D from the BD.

When the reading command of the file B is issued, the interleave units of the data stream of the file B among the interleaved data are read, so that the file B can be read. Similarly, it is possible to read the file D by issuing the reading command of the file D.

However, as described with reference to FIG. 6, in order to display the stereoscopic image by the base image and the extended image after the interleaved data is read from the BD as the file C, for example, it is necessary to re-form the data stream of the file B of the base image and the data stream of the file D of the extended image from the interleaved data, in an application which controls the display of the stereoscopic image by the base image and the extended image.

In order to re-form the data stream of the file B of the base image and the data stream of the file D of the extended image from the interleaved data, it is necessary to de-interleave the respective interleave units of the files B and D in the interleaved data.

Further, in order to de-interleave the interleave units, it is necessary to provide position information on the respective interleave units of the files B and D, in the interleaved data.

Thus, in the new file management method, the file C in which the interleaved data is stored is formed as a file of the ISO base media file format.

Here, the ISO base media file format is formally an international standard called ISO/IED (International Organization for Standardization/International Engineering Consortium) 14496-12: Part 12, and is defined in ISO/IEC 14496-12: 2005 (E) Part 12: ISO base media file format.

The outline of the ISO base media file format will be described with reference to FIGS. 7 to 13.

Figure 7:
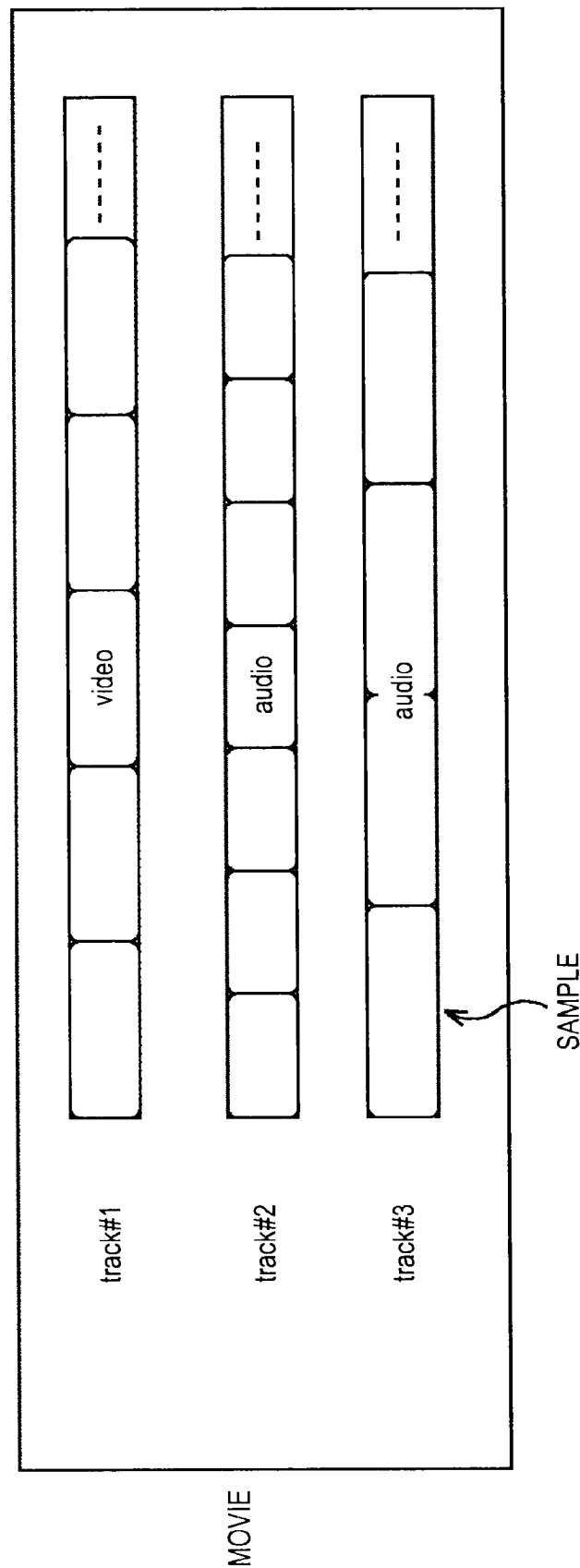
FIG. 7 is a diagram illustrating a movie in an ISO file.

FIG. 7 is a diagram illustrating a movie of a file based on the ISO base media file format (hereinafter, referred to as "ISO file").

In the ISO base media file format, a set of media data (AV (Audio Visual) data) such as video or audio which is a reproduction target is referred to as the "movie", and the movie includes one or more tracks.

One piece of independent media data such as video or audio which is the reproduction target (data stream (for example, elementary stream)) (data stream, not file) forms one track, and one or more of the tracks included in the movie can be simultaneously reproduced.

In FIG. 7, the movie includes three tracks #1, #2 and #3. Further, track #1 includes a video data stream, and track #2 includes an audio data stream of 1 channel accompanying the video, and track #3 includes an audio data stream of another 1 channel accompanying the video, respectively.

Media data on each track includes a sample.

Here, the "sample" is the smallest unit (access unit) when accessing the media data in the ISO file. Accordingly, it is not possible to access the media data in the ISO file with a unit smaller than the sample.

With respect to the media data on the video, for example, one frame (or one field), one GOP (Group of Pictures) based on MPEG-2 Video specification or the like becomes one sample. Further, with respect to the media data on the audio, for example, one audio frame or the like regulated by the specification of the media data on the audio becomes one sample.

Figure 8:
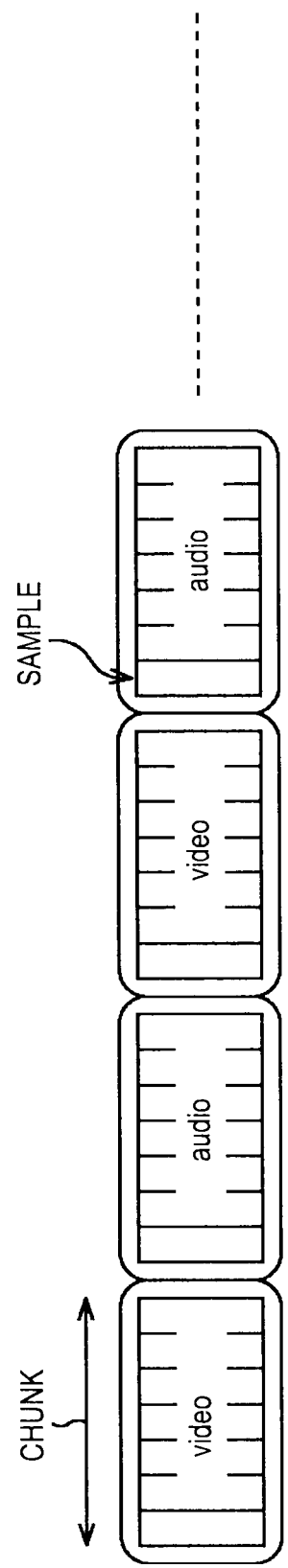
FIG. 8 is a diagram illustrating a logical arrangement of media data (movie) in an ISO file.

FIG. 8 is a diagram illustrating a logical arrangement of media data (movie) in the ISO file.

The media data is arranged in a unit called a "chunk".

In a case where a plurality of pieces of data, that is, for example, two data streams of a video data stream and an audio data stream are present as the media data of the movie, the plurality of pieces of media data is interleaved in the chunk unit.

Here, the chunk corresponds to a set of one or more samples arranged in addresses which are logically continued.

Figure 9:
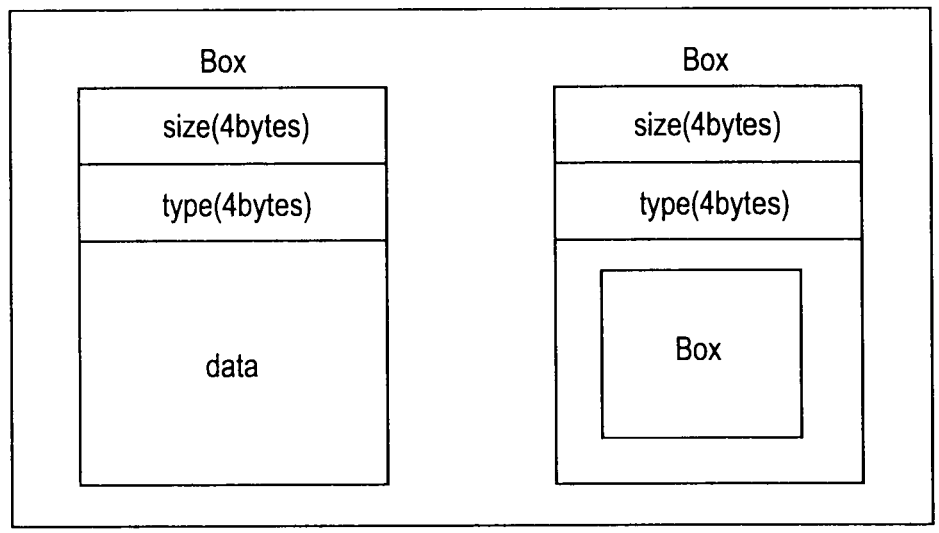
FIG. 9 is a diagram illustrating a data structure of an ISO file.

FIG. 9 illustrates a data structure of the ISO file.

The ISO file is formed in a unit called a "box", and has a structure called a "box structure".

The box includes 4 bytes of size, 4 bytes of type, and actual data.

The size represents the size of the entire box and the type represents the type of the actual data in the box.

As the actual data, for example, a box can be employed, instead of data such as media data as described above.

That is, the box can hold the box as the actual data, and thus can have a hierarchical structure.

When the box is employed as the actual data, the type represents the type of the box which is the actual data ("moov" or the like which will be described later).

Figure 10:
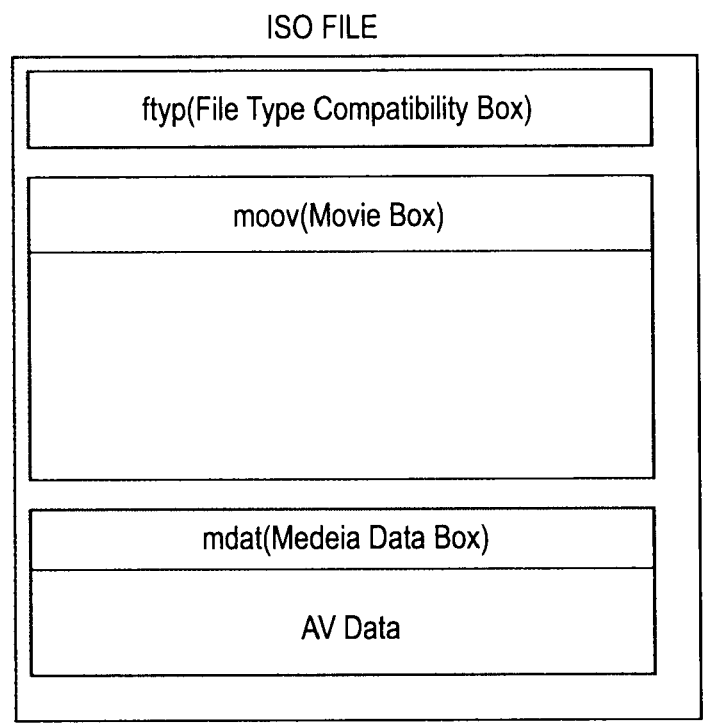
FIG. 10 is a diagram illustrating a data structure of an ISO file in which media data is stored.

FIG. 10 illustrates a data structure of the ISO file in which media data is stored.

In FIG. 10, the ISO file includes boxes of "ftyp" (File Type Compatibility Box), "moov" (Movie Box), and "mdat" (Media Data Box).

The box "ftyp" includes information on the file format, that is, information that the file is the ISO file, and information on a box version, a name of a manufacturer which creates the ISO file and the like, for example.

The box "moov" includes metadata on a time axis, an address or the like for management of the media data, for example.

The box "mdat" includes media data (AV data).

Figure 11:
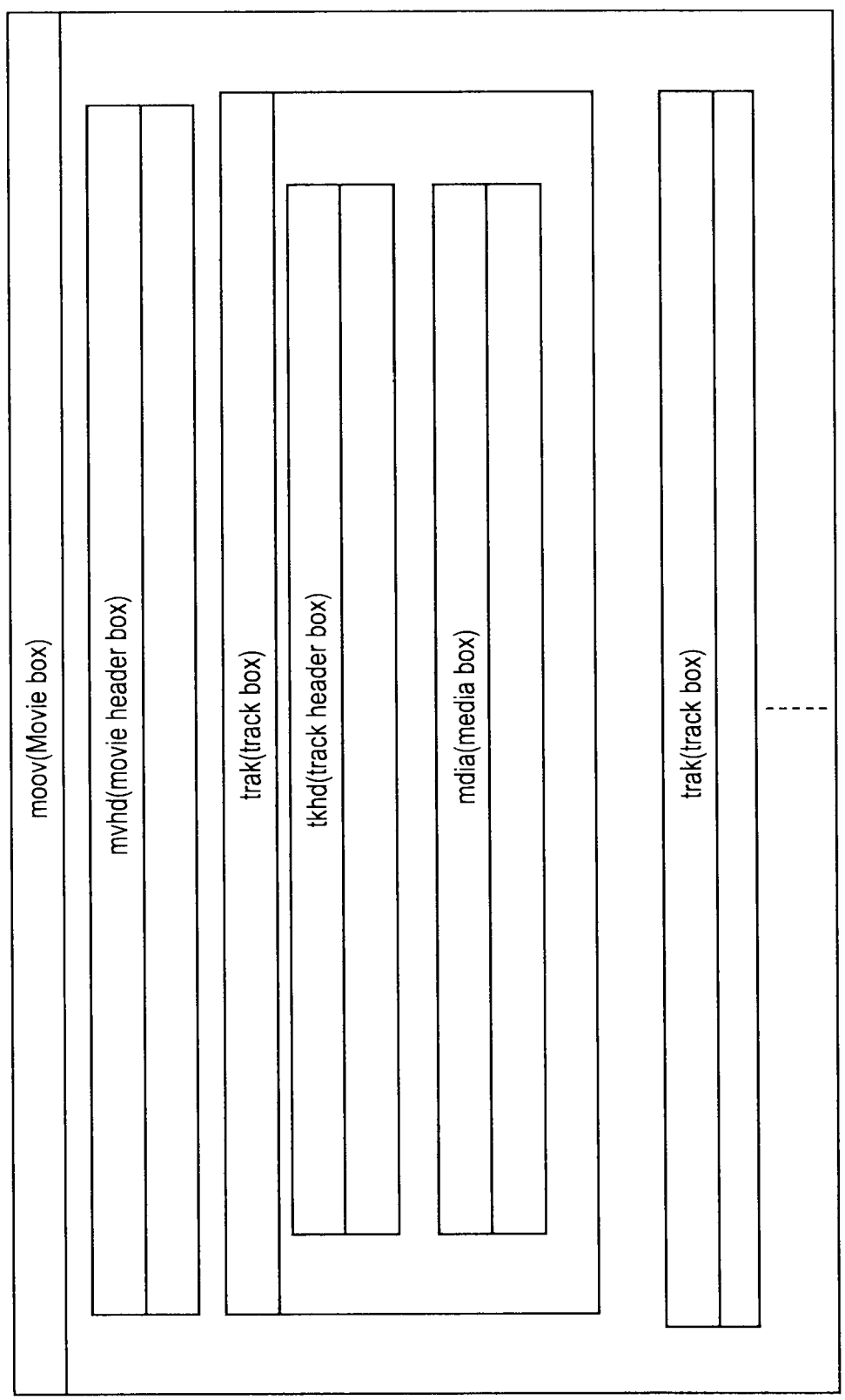
FIG. 11 is a diagram illustrating a configuration example of a box "moov".

FIG. 11 illustrates a configuration example of the box "moov" in FIG. 10.

The box "moov" includes a box "mvhd" (movie header box) and one or more boxes "trak" (track box).

The box "mvhd" includes header information on a creation date or the like of the box "moov".

The box "trak" includes a box "tkhd" (track header box) which is information relating to one track which forms the movie (FIG. 7) and a box "mdia" (media box).

The box "tkhd" includes information relating to the media data which forms the track, such as a display size of the video.

The box "mdia" includes information on the type of the media data which forms the track (for example, the media data is video data, audio data or the like), a time scale (reproduction time of the sample of the media data which forms the track, or the like), and a language used for the media data.

Figure 12:
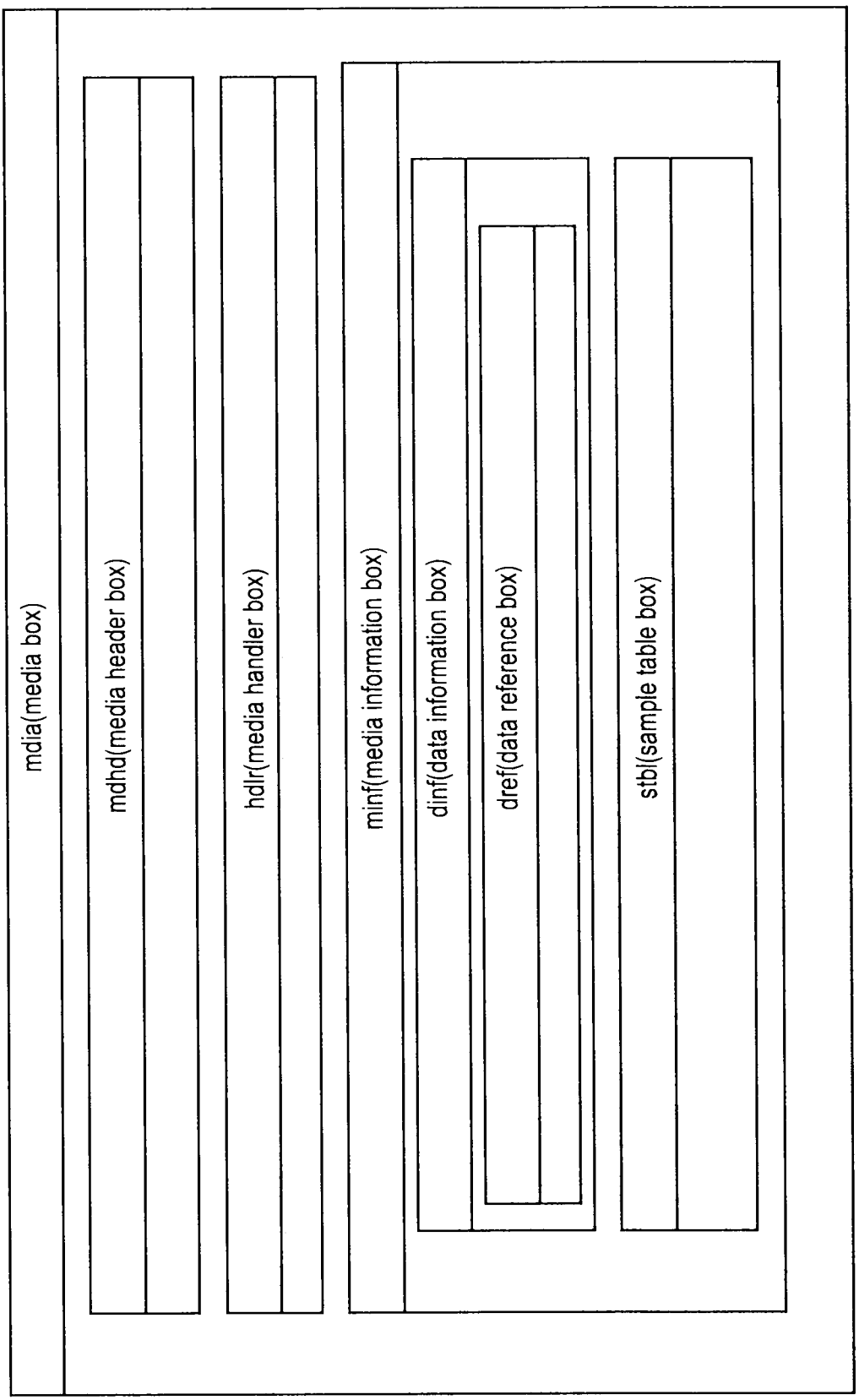
FIG. 12 is a diagram illustrating a configuration example of a box "mdia".

That is, FIG. 12 illustrates a configuration example of the box "mdia" in FIG. 11.

The box "mdia" includes boxes of "mdhd" (media header box), "hdlr" (media handler box) and "minf" (media information box).

The box "mdhd" includes overall information relating to the media data, such as a creation date of the media data which forms a track in which the box "trak" (FIG. 11) including the box "mdhd" has information.

The box "hdlr" includes information on the type of the media data which forms a track in which the box "trak" (FIG. 11) including the box "hdlr" has information.

The box "minf" includes a box "dinf" (data information box) and a box "stbl" (sample table box) which are information other than the information included in the boxes "mdhd" and "mdlr", among information on the media data which forms a track in which the box "trak" (FIG. 11) including the box "minf" has information.

The box "dinf" includes a box "dref", and the box "dref" includes information on the position in the ISO file, of (the media data which forms) a track in which the box "trak" (FIG. 11) including the box "dref" has information.

The box "stbl" includes information on a sample of the media data which forms a track in which the box "trak" (FIG. 11) including the box "stbl" has information.

Figure 13:
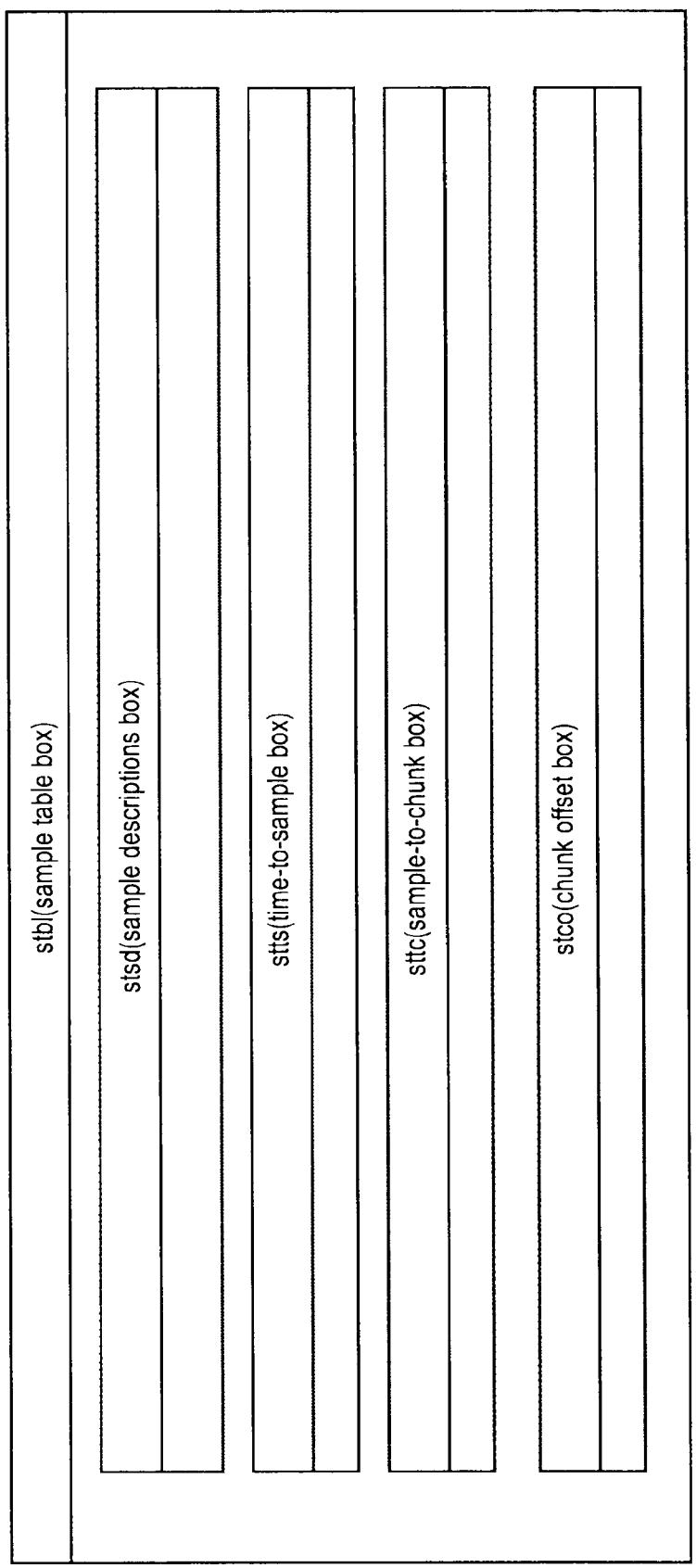
FIG. 13 is a diagram illustrating a configuration example of a box "stbl".

That is, FIG. 13 illustrates a configuration example of the box "stbl" in FIG. 12.

The box "stbl" includes boxes of "stsd" (sample descriptions box), "stts" (time-to-sample box), "sttc" (sample-to-chunk box) and "stco" (chunk offset box).

The box "stsd" includes detailed information relating to the sample, such as a codec type of the sample of the media data which forms a track the box "trak" (FIG. 11) including the box "stsd" has information or initial information set in a decoder.

The box "stts" includes a table representing the corresponding relationship between a reproduction time (section) called "sample duration" and the number of samples (sample count) with the duration. According to this table, it is possible to recognize the number (the number representing a reproduction order of the samples) of samples to be decoded at a decoding time, from the decoding time of the sample with reference to the time of a header of the ISO file.

The box "sttc" includes information on the number of samples which form the chunk (FIG. 8).

The box "stco" includes information on the position of the chunk with reference to the header of the ISO file.

In the new file management method, the file C in which the interleaved data is stored is formed as the above-described ISO file.

Figure 14:
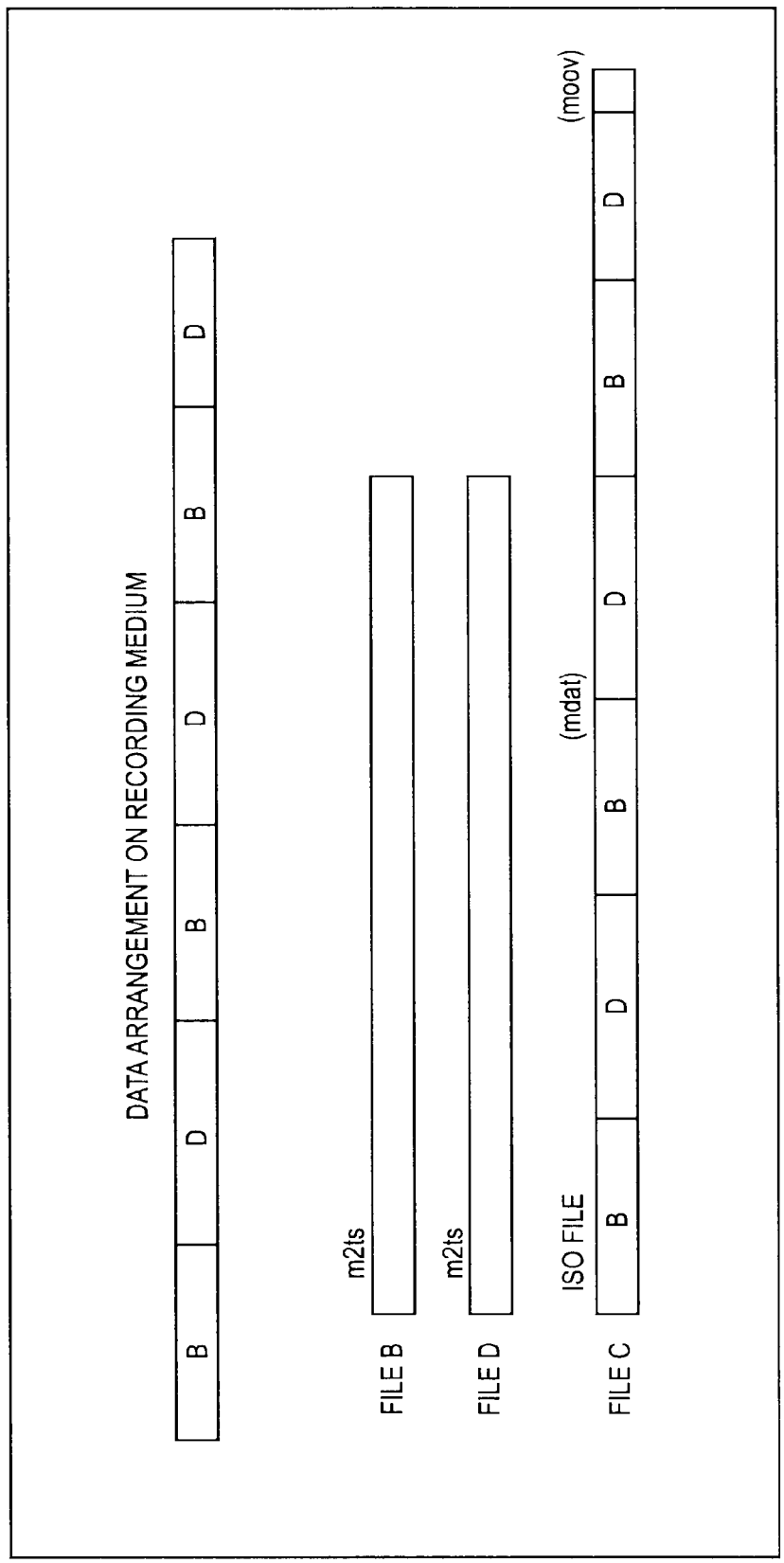
FIG. 14 is a diagram illustrating a file C which is formed as an ISO file.

That is, FIG. 14 illustrates the file C which is formed as the ISO file.

As described with reference to FIG. 5, in the new file management method, the interleaved data obtained by dividing each of the data streams of the file B of the base image and the file D of the extended image which are two files recorded on the recording medium such as a BD into the interleave units and by interleaving the interleave units of the file B of the base image and the file D of the extended image, are physically and continuously recorded on the BD.

Further, in the new file management method, the file B which is the TS file (hereinafter, referred to as "m2ts" file) based on MPEG2, which stores the arrangement of the interleave units of the base image (file B) and the file D which is the m2ts file which stores the arrangement of the interleave units of the extended image (file D), among the interleaved data, are created.

Further, in the new file management method, the file C which stores the interleaved data is created as the ISO file using the link function of the file system.

Further, the substance of the file C is the interleaved data obtained by interleaving the interleave units obtained by dividing the data streams of the file B of the base image and the file D of the extended image, but each of the data streams of the files B and D corresponds to one track of the ISO base media file format (FIG. 7) in the new file management method.

That is, the data stream of the file B of the base image forms one track of the "movie" of the file C which is the ISO file, and the data stream of the file D of the extended image forms a different one track.

Further, in the new file management method, the box "mdat" (FIG. 10) of the file C which is the ISO file includes the interleaved data, and the box "moov" (FIG. 10) includes position information representing positions of the interleave units of the interleaved data.

In FIG. 14, the box "moov" is arranged in a (logically) final position of the file C which is the ISO file.

As described above, in the new file management method, the files B and D which are the plurality of m2ts files are divided into the interleave units, and the interleave units are interleaved to form the file C which is one ISO file. Further, the file C which is the ISO file includes the interleave unit position information in the file C as metadata of the file C.

Figure 15:
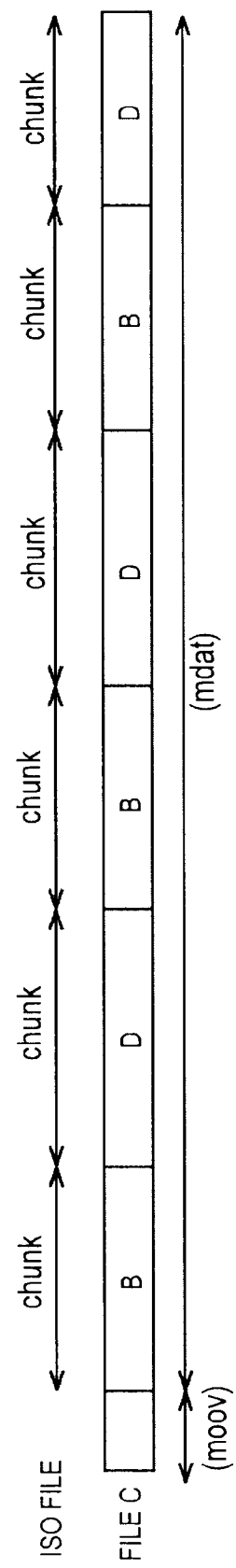
FIG. 15 is a diagram illustrating position information included in a box "moov" of a file C which is an ISO file.

FIG. 15 is a diagram illustrating the position information included in the box "moov" of the file C which is the ISO file.

In FIG. 14, the box "moov" is arranged in the final position of the file C which is the ISO file, but in FIG. 15, the box "moov" is arranged in a header position. In this way, the box "moov" may be arranged in the (logically) header position of the file C, or may be arranged in the final position.

In the new file management method, using the interleave unit of the file C which is the ISO file as the chunk (FIG. 8) of the ISO base media file format, the position information (byte number up to the header position of the chunk) representing a relative position, from the header (header of the ISO file) of the interleaved data, of the interleave unit which forms the chunk is included in the box "stco" (chunk offset box) (FIG. 13) included in the box "moov".

That is, in the new file management method, the interleave unit of the file C which is the ISO file becomes the chunk (FIG. 8) of the ISO base media file format. As a result, the chunk position information included in the box "stco" included in the box "moov", with reference to the header of the ISO file, corresponds to the position information representing the position on the interleaved data of the interleave unit which forms the chunk.

Accordingly, it is possible to divide the interleaved data of the file C into the interleave units of the file B of the base image and the interleave units of the file D of the extended image, on the basis of the box "stco" which is the position information.

As a result, it is possible to read the file C and to then re-form the files B and D from the file C.

That is, by issuing only the reading command of the file C instead of issuing the reading command of each of the files B and D, it is possible to read each of the files B and D.

Accordingly, it is possible to simultaneously and rapidly read the files B and D (in an equivalent manner).

In the above description, assuming that the files B and D are present, the interleaved data obtained by dividing the data streams of the files B and D into the interleave units and by interleaving the interleave units is shared as the data stream of the file C which is the ISO file, using the link function of the file system. However, such data sharing can also be realized by sharing the interleave units of the base image as the data stream of the file B and by sharing the interleave units of the extended image as the data stream of the file D, among the interleaved data, using the link function of the file system, assuming that the file C which is the ISO file which stores the interleaved data is present.

FIG. 16 illustrates a target allocated to each unit of the data having the ISO base media file format in the new file management method.

In the new file management method, each of the interleaved files B and D is allocated to one track of the ISO base media file format.

Further, in the new file management method, the interleave unit obtained by dividing each of the interleaved files B and D is allocated to one chunk of the ISO base media file format.

Further, in the new file management method, one GOP (or one frame) of the data stream (TS) of each of the file B of the base image and the file D of the extended image is allocated to one sample of the ISO base media file format.

An audio frame of the audio accompanying the base image and the extended image (for example, when an object which appears in the base image or the like issues sound, the sound therein is the audio) is included in one sample allocated with reference to the image.

[Configuration Example of Stereoscopic Vision System using Reproduction Apparatus]

Figure 17:
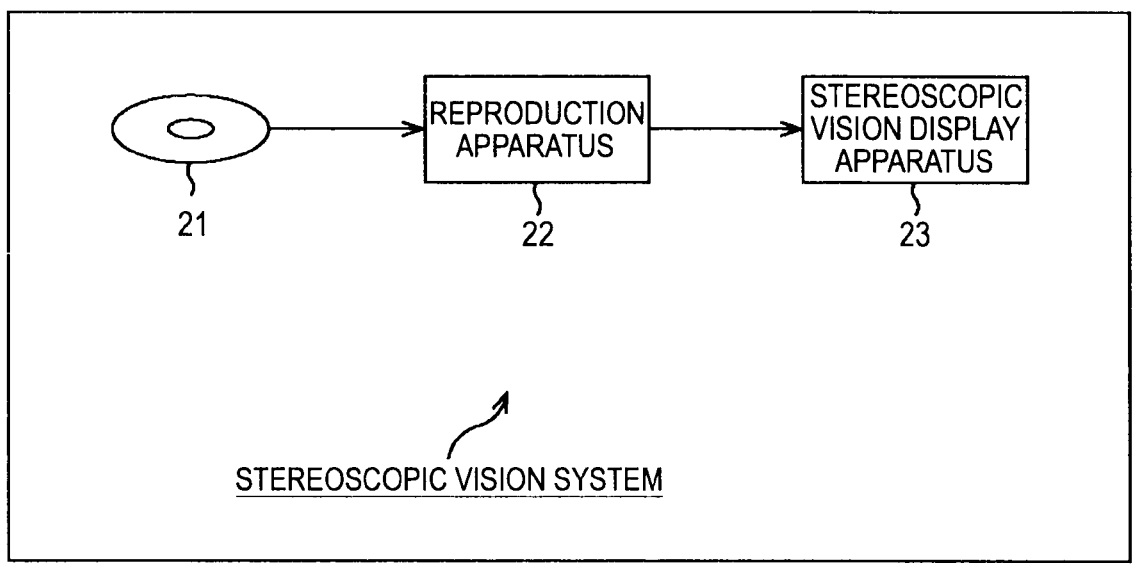
FIG. 17 is a diagram illustrating a configuration example of a stereoscopic vision system using a reproduction apparatus to which the present invention is applied.

FIG. 17 illustrates a configuration example of a stereoscopic vision system using the reproduction apparatus to which the present invention is applied.

In FIG. 17, the stereoscopic vision system includes a reproduction apparatus 22 and a stereoscopic vision display apparatus 23.

A disc 21 such as a BD is detachably installed to the reproduction apparatus 22.

In the new file management method, for example, the files B and D which are the m2ts files and the file C which is the ISO file, as described above, are recorded on the disc 21.

Here, it is possible to record on the disc 21 data streams of images for stereoscopic vision having three or more N viewpoints, instead of the data streams of the images having two viewpoints in which one of data streams of the files B and D, that is, one of the left eye image and the right eye image is used as the base image and the other thereof is used as the extended image.

In this case, the ISO file which includes the box "mdat" (FIG. 10) including interleaved data which is obtained by dividing each of the data streams of the image files for stereoscopic vision having N viewpoints recorded on the disc 21 into interleave units and by interleaving the interleave units of the data streams of N files and is physically and continuously recorded on the disc 21, and the box "moov" (FIG. 10) including the box "stco" (FIG. 13) which is the position information representing the position on the interleaved data of the interleave unit which forms the chunk, when the interleave unit is used as the chunk of the ISO base media file format, is recorded on the disc 21 together with each file of the images for stereoscopic vision having N viewpoints.

In the interleaved data obtained by interleaving the interleave units of the data streams of N files, the interleave units are arranged in such an order of a first file interleave unit, a second file interleave unit, . . . , an N-th file interleave unit, a first file interleave unit, and so on.

The reproduction apparatus 22 reads the file C which is the ISO file from the disc 21 installed thereto, re-forms the file B (data stream) of the base image and the file D (data stream) of the extended image from the file C (data stream (interleaved data)), and then supplies the re-formed files to the stereoscopic vision display apparatus 23.

The stereoscopic vision display apparatus 23 displays the base image on the basis of the file B (data stream) from the reproduction apparatus 22 and displays the extended image on the basis of the file D (data stream) from the reproduction apparatus 22, to thereby display the stereoscopic vision image.

It is possible for the reproduction image 22 to read only the file B or only the file D from the disc 21.

[Configuration Example of First Embodiment of Reproduction Apparatus to which the Present Invention is Applied]

Figure 18:
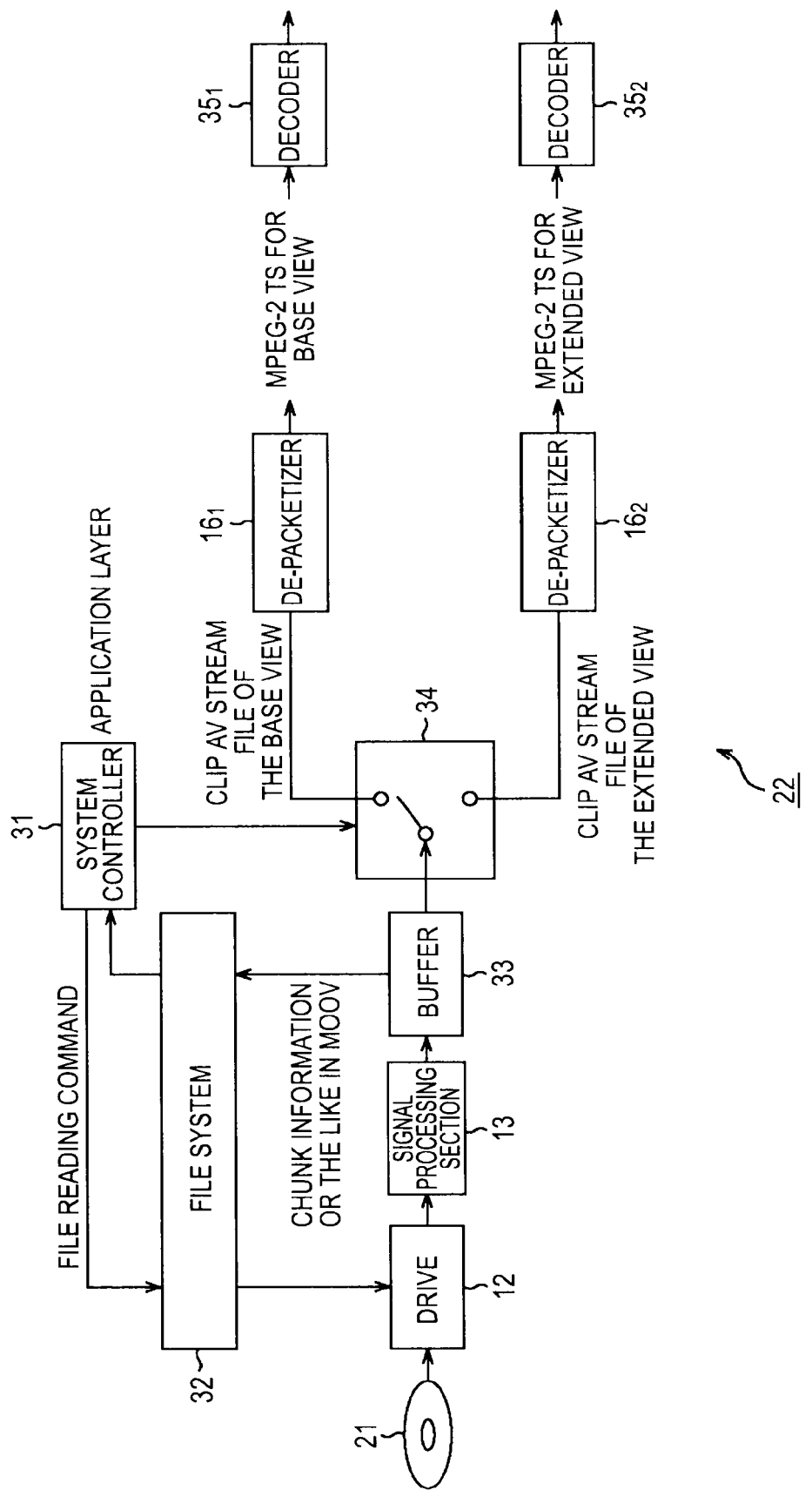
FIG. 18 is a block diagram illustrating a configuration example of an embodiment of a reproduction apparatus to which the present invention is applied.

FIG. 18 is a block diagram illustrating a configuration example of an embodiment of the reproduction apparatus to which the present invention is applied.

That is, FIG. 18 illustrates a functional configuration example of the reproduction apparatus 22 in FIG. 17.

In the figure, the same reference numerals are given to the same elements as in the reproduction apparatus in FIG. 3, and detailed description thereof will be appropriately omitted.

The reproduction apparatus 22 performs a reproduction process of reproducing the file recorded on the disc 21 by the new file management method.

That is, in FIG. 18, the reproduction apparatus 22 includes a drive 12, a signal processing section 13, de-packetizers $16_1$ and $16_2$, a system controller 31, a file system 32, a buffer 33, a de-interleaver 34 and decoders $35_1$ and $35_2$.

Here, the reproduction apparatus 22 is the same as the reproduction apparatus in FIG. 3 in that the drive 12, the signal processing section 13 and the de-packetizers $16_1$ and $16_2$ are provided.

Here, the reproduction apparatus 22 is different from the apparatus in FIG. 3 in that the buffer 33 is provided instead of the buffers $15_1$ and $15_2$ and the de-interleaver 34 is provided instead of the switch 14.

Further, the reproduction apparatus 22 is different from the apparatus in FIG. 3 in that the system controller 31, the file system 32 and the decoders $35_1$ and $35_2$ are newly provided.

The system controller 31 is a kind of application, and controls the file system 32 or the de-interleaver 34.

That is, the system controller 31 issues a reading command of the file B or D which is the m2ts file to the file system 32, and thus reads the file B or D from the disc 21.

Further, the system controller 31 issues a reading command of the file C which is the ISO file to the file system 32, and thus reads the file C from the disc 21.

Further, the system controller 31 obtains the box "moov" obtained by reading the file C from the disc 21 through the file system 32, and controls the de-interleaver 34 on the basis of the box "stco" (FIG. 13), which is the position information on the interleave units (chunks) which form the interleaved data of the file C, which is included in the box "moov", to thereby de-interleave the interleaved data of the file C into the interleave units of the file B and the interleave units of the file D.

The file system 32 is a general-purpose file system, for example, and performs accessing the file on the disc 21 and management and control for files.

That is, the file system 32 can access the files B and D which are the m2ts files and the file C which is the ISO file, in which data is shared by the files B and C and by the files D and C, using the link function.

Further, when a reading command of the file B, C or D is issued from the system controller 31, the file system 32 allows the drive 12 to read a file corresponding to the reading command from the system controller 31, from the disc 21.

A data stream of the file read from the disc 21 is supplied to the buffer 33 through the drive 12 and the signal processing section 13.

The buffer 33 temporarily stores the data stream on the file which is read from the disc 21 and supplied from the signal processing section 13, and then supplies the stored data stream to the de-interleaver 34.

When the file read from the disc 21 is the file C which is the ISO file, the buffer 33 supplies the box "moov" which includes the box "stco" which is the position information on the interleave unit (chunk) which is supplied from the signal processing section 13 and is stored in the file C to the system controller 31 through the file system 32.

When the file read from the disc 21 is the file C which is the ISO file, the de-interleaver 34 de-interleaves the interleaved data of the file C supplied from the buffer 33 into the interleave units of the file B and the interleave units of the file D under the control of the system controller 31.

Further, the de-interleaver 34 re-forms the data stream of the base image in which the interleave units of the file B are continuously arranged and the data stream of the extended image in which the interleave units of the file D are continuously arranged.

Further, the de-interleaver 34 supplies the data stream of the base image of the file B to the decoder $35_1$ through the de-packetizer $16_1$, and supplies the data stream of the base image of the file D to the decoder $35_2$ through the de-packetizer $16_2$.

The decoder $35_1$ divides the data stream (TS) of the base image from the de-packetizer $16_1$ into elementary streams (PES (Packetized Elementary Stream)) by a de-multiplexer (not shown). Then, the decoder $35_1$ performs MPEG-decoding for the image data on the base image and supplies the result to the stereoscopic vision display apparatus 23 (FIG. 17).

The decoder $35_2$ divides the data stream (TS) of the extended image from the de-packetizer $16_2$ into elementary streams by a de-multiplexer (not shown). Then, the decoder $35_2$ performs MPEG-decoding for the image data on the extended image and supplies the result to the stereoscopic vision display apparatus 23.

Figure 19:
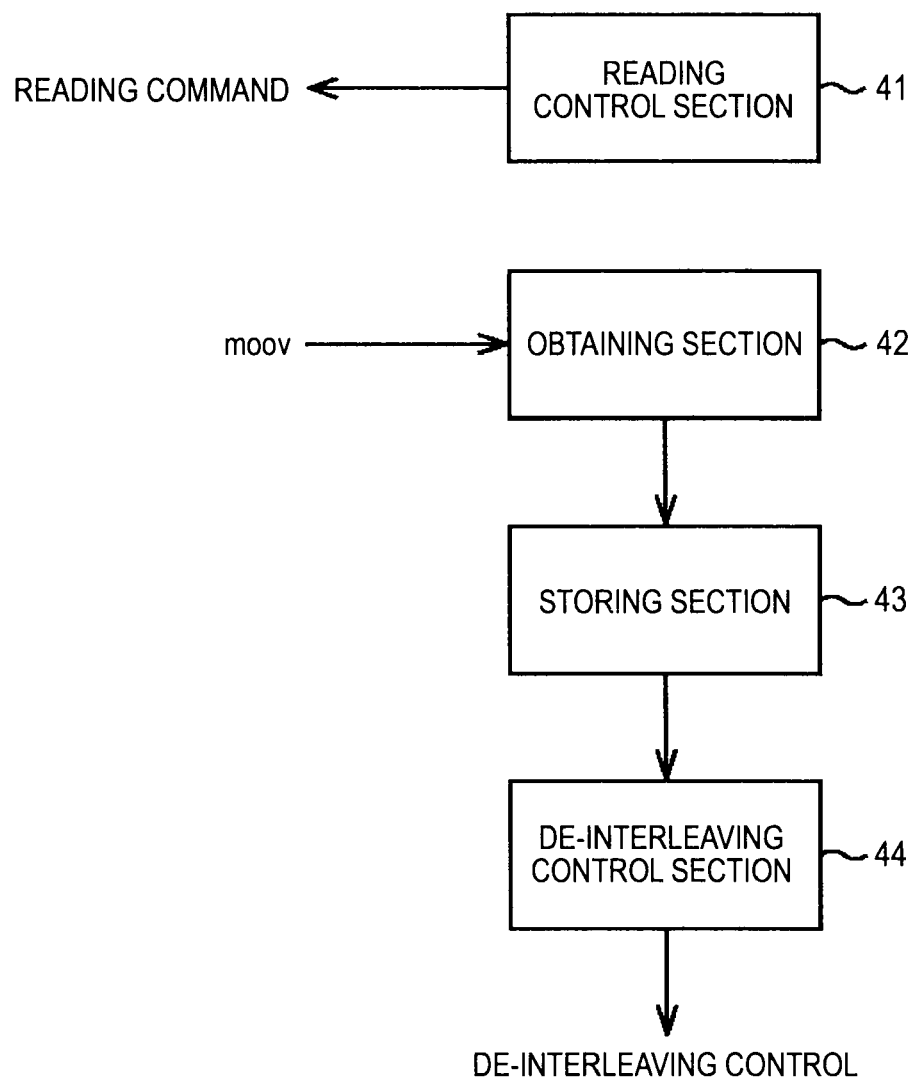
FIG. 19 is a block diagram illustrating a configuration example of a system controller 31.

FIG. 19 is a block diagram illustrating a functional configuration example of the system controller 31 in FIG. 18.

In FIG. 19, the system controller 31 includes a reading control section 41, an obtaining section 42, a storing section 43, and a de-interleaving control section 44.

For example, by issuing the reading command of the file C to the file system 32 (FIG. 18) according to a user operation (for example, reproduction button operation for instructing reproduction) or the like, the reading control section 41 performs reading control of continuously reading the interleaved data of the file C from the disc 21.

In a case where the file C is read from the disc 21, the obtaining section 42 obtains the box "moov" including the box "stco" which is the position information on the interleave unit (chunk) of the file C from the buffer 33 (FIG. 18) via the file system 32.

Further, the obtaining section 42 supplies the box "moov" to the storing section 43.

The storing section 43 stores the box "moov" supplied from the obtaining section 42.

The de-interleaving control section 44 controls the de-interleaver 34 (FIG. 18) on the basis of the box "stco", which is the position information on the interleave unit (chunk) of the file C, included in the box "moov" stored in the storing section 43.

That is, the de-interleaving control section 44 de-interleaves the interleaved data into the interleave units of the file B and the interleave units of the file D on the basis of the box "stco", and performs de-interleaving control for re-forming each of the files B and C which includes each interleave unit.

[Reproduction Method]

Figure 20:
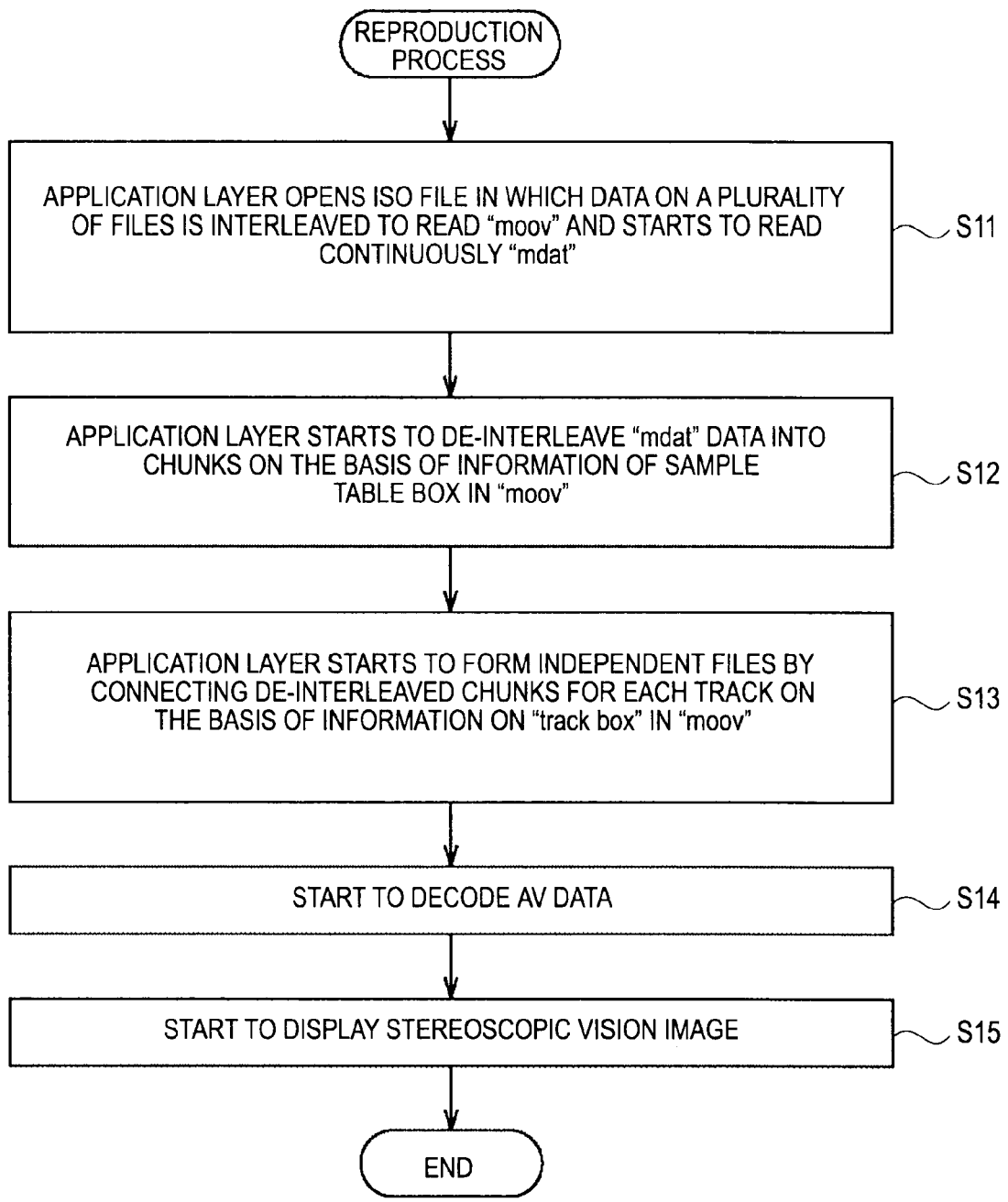
FIG. 20 is a flowchart illustrating a reproduction method.

FIG. 20 is a flowchart illustrating a process (reproduction process) performed by the stereoscopic vision system in FIG. 17.

In step S11, the system controller 31 (application layer) of the reproduction apparatus 22 (FIG. 18) opens the file C which is the ISO file recorded on the disc 21 and then reads (obtains) the box "moov" of the file C. Further, the system controller 31 starts to continuously read the interleaved data of the file C from the disc 21.

That is, in step S11, the reading control section 41 of the system controller 31 (FIG. 19) issues the reading command of the file C which is the ISO file to the file system 32 (FIG. 18).

The file system 32 allows the drive 12 to read the box "moov" (FIG. 10) of the file C from the disc 21 according to the issue of the reading command of the file C from the system controller 31.

The box "moov" read from the disc 21 by the drive 12 is supplied to and stored in the buffer 33 through the signal processing section 13.

The obtaining section 42 of the system controller 31 (FIG. 19) obtains the box "moov" recorded in the buffer 33 through the file system 32 (FIG. 18), and then supplies the result to the storing section 43 for storage.

Further, the file system 32 allows the drive 12 to start to continuously read the box "mdat" (FIG. 10) of the file C from the disc 21 according to the issue of the reading command of the file C from the system controller 31.

The box "mdat" read from the disc 21 by the drive 12, that is, the interleaved data is supplied to the buffer 33 through the signal processing section 13.

The buffer 33 temporarily stores the interleaved data from the signal processing section 13 and starts to supply the interleaved data to the de-interleaver 34 in the stored order.

Then, the routine proceeds to step S12 from step S11, and the de-interleaving control section 44 of the system controller 31 (FIG. 19) performs de-interleaving control of the de-interleaver 34 (FIG. 18) so that the interleaved data of the file C is de-interleaved into the interleave units of the file B and the interleave units of the file D.

That is, the de-interleaving control section 44 (FIG. 19) controls the de-interleaver 34 (FIG. 18) to recognize the positions of the interleave units on the basis of the box "stco", which is the position information of the interleave units, included in the box "stbl" (sample table box) (FIG. 13) included in the box "moov" stored in the storing section 43, and to de-interleave the interleaved data in the positions.

Thus, the de-interleaver 34 starts to de-interleave the interleaved data of the file C supplied from the buffer 33 into the interleave units of the file B and the interleave units of the file D as chunks.

Then, the routine proceeds to step S23 from step S12, and the de-interleaving control section 44 of the system controller 31 (FIG. 19) performs the de-interleaving control of the de-interleaver 34 (FIG. 18) so as to re-form the files B and C, respectively.

That is, the de-interleaving control section 44 (FIG. 19) controls the de-interleaver 34 to recognize the track information such as the number of tracks which form the movie (FIG. 7) of the file C from the box "trak" (track box) (FIG. 11)

included in the box "moov" stored in the storing section 43, and to re-form the files (data streams) of the same number as the number of tracks.

Thus, the de-interleaver 34 starts to re-form the data stream of the base image in which the interleave units of the file B are continuously arranged (connected) and the data stream of the extended image in which the interleave units of the file D are continuously arranged, from the interleave units de-interleaved from the interleaved data.

The file B of the base image which is re-formed by the de-interleaver 34 is supplied to the decoder 35$_1$ through the de-packetizer 16$_1$. Further, the file D of the extended image which is re-formed by the de-interleaver 34 is supplied to the decoder 35$_2$ through the de-packetizer 16$_2$.

Then, the routine proceeds to step S14 from step S13, and the decoder 35$_1$ de-multiplexes and MPEG decodes the data stream (TS) of the base image supplied through the de-packetizer 16$_1$ into the image data (AV data) (media data) on the base image, and starts to supply the result to the stereoscopic vision display apparatus 23 (FIG. 17).

Further, in step S14, the decoder 35$_2$ de-multiplexes and MPEG decodes the data stream (TS) of the extended image supplied through the de-packetizer 16$_2$ into the image data on the extended image, and starts to supply the result to the stereoscopic vision display apparatus 23.

Further, the routine proceeds to step S15 from step S14, and the stereoscopic vision display apparatus 23 (FIG. 17) starts to display the base image on the basis of the file B (data stream) from the decoder 35$_1$ of the reproduction apparatus 22, and starts to display the extended image on the basis of the file D (data stream) from the decoder 35$_2$ of the reproduction apparatus 22, and thus, the stereoscopic vision image starts to be displayed.

[Configuration Example According to Embodiment of Recording Apparatus to which the Present Invention is Applied]

Figure 21:
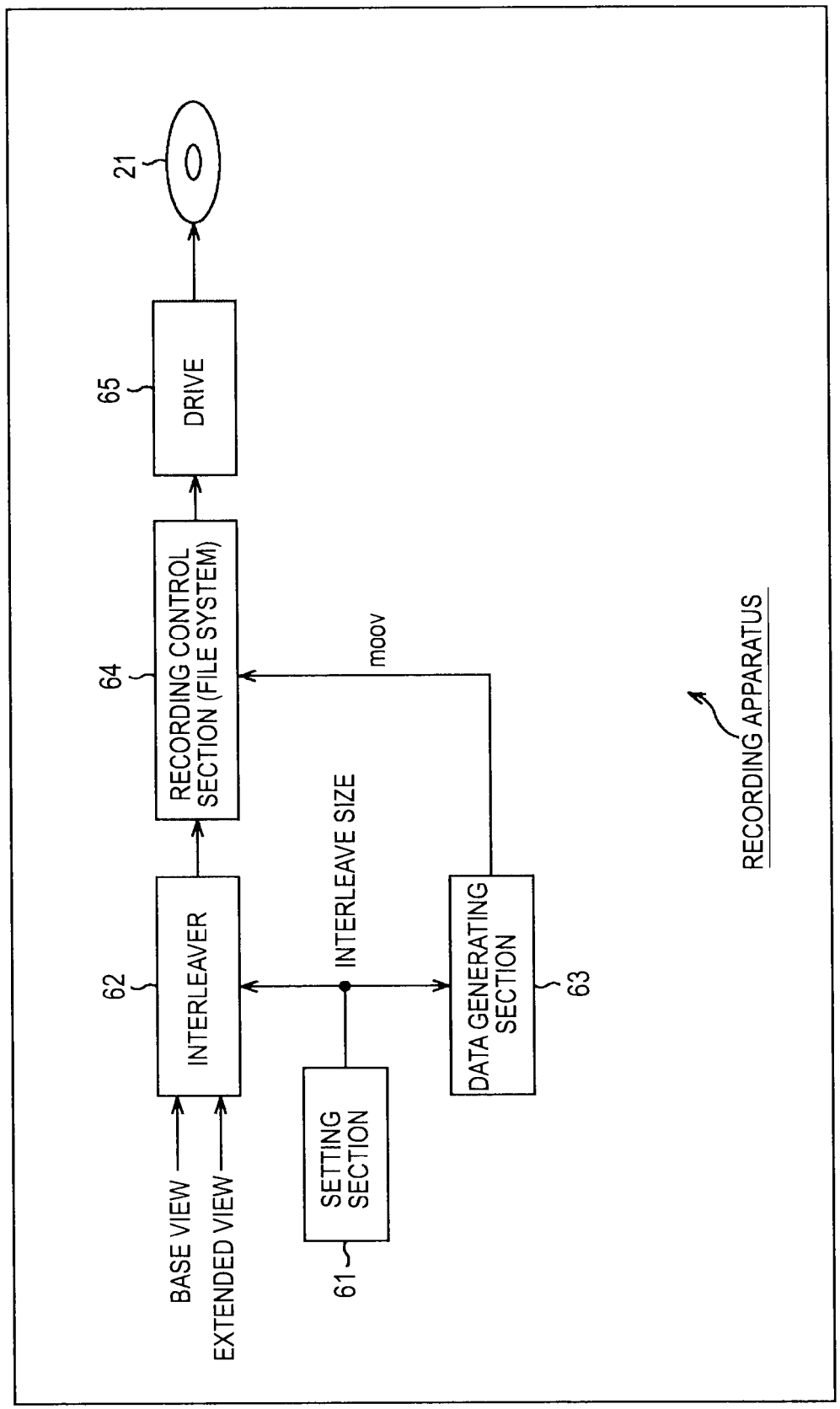
FIG. 21 is a block diagram illustrating a configuration example of an embodiment of a recording apparatus to which the present invention is applied.

FIG. 21 is a block diagram illustrating a configuration example of an embodiment of a recording apparatus to which the present invention is applied.

In FIG. 21, the recording apparatus performs a recording process of recording the file on the disc 21 using the new file management method.

That is, in FIG. 21, the recording apparatus includes a setting section 61, an interleaver 62, a data generating section 63, a recording control section 64 and a drive 65.

The setting section 61 sets an interleave size which is the size of the interleave unit, on the basis of drive performance regulated in the specification of the disc 21 (for example, access time or transmission speed), the number of files (for example, files B and D) (hereinafter, referred to as a "target file") in which the data streams are divided into the interleave units, the bit rate of the data stream of the target file, and the like, so that reading of the data streams of all the target files are performed in time for reproduction.

Further, the setting section 61 supplies size information indicating the interleave size to the interleaver 62 and the data generating section 63.

The data streams (TS) of the file B of the base image and the file D of the extended image, that is, the target files recorded on the disc 21 are supplied to the interleaver 62.

The interleaver 62 divides each of the data streams of the file B of the base image and the file D of the extended image into the interleave units of the interleave size indicated by the size information from the setting section 61.

Further, by interleaving the interleave units of each of the data streams of the file B of the base image and the file D of the extended image, the interleaver 62 generates the interleaved data which is physically and continuously recorded on the disc 21.

Further, the interleaver 62 supplies the interleaved data to the recording control section 64.

The data generating section 63 generates (calculates) the position information indicating the position on the interleaved data of the interleave unit which forms the chunk, using the interleave unit as the chunk of the ISO base media file format, from the interleave size indicated by the size information supplied from the setting section 61.

Further, the data generating section 63 generates necessary information which is information required for generation of the box "moov" (FIG. 10) of the file C which is the ISO file, such as a box "stbl" (sample table box) (FIG. 13) including the box "stco" which is the position information or a box "trak" (track box) (FIG. 11) including the track information which includes the data streams of the file B of the base image and the file D of the extended image. Further, the data generating section 63 generates the box "moov" using the necessary information, and supplies the box "moov" to the recording control section 64.

The recording control section 64 includes the file system, and controls the drive 65, so as to perform recording control for data recording on the disc 21.

That is, the recording control section 64 performs recording control for physically and continuously recording the interleaved data and for recording the box "moov" on the disc 21, using the interleaved data from the interleaver 62, the box "moov" from the data generating section 63, and the like as the file C which is one file of the ISO base media file format.

Further, the recording control section 64 performs recording control for recording, on the disc 21, the file B of which the content is the arrangement of the interleave units of the base image and the file D of which the content is the arrangement of the interleave units of the extended image, among the interleaved data which is the content of the file C recorded on the disc 21 using the link function of the file system.

The disc 21 is detachably installed in the drive 65.

The drive 65 drives the disc 21, so as to record data on the disc 21 under the control of the recording control section 64.

[Recording Process]

Figure 22:
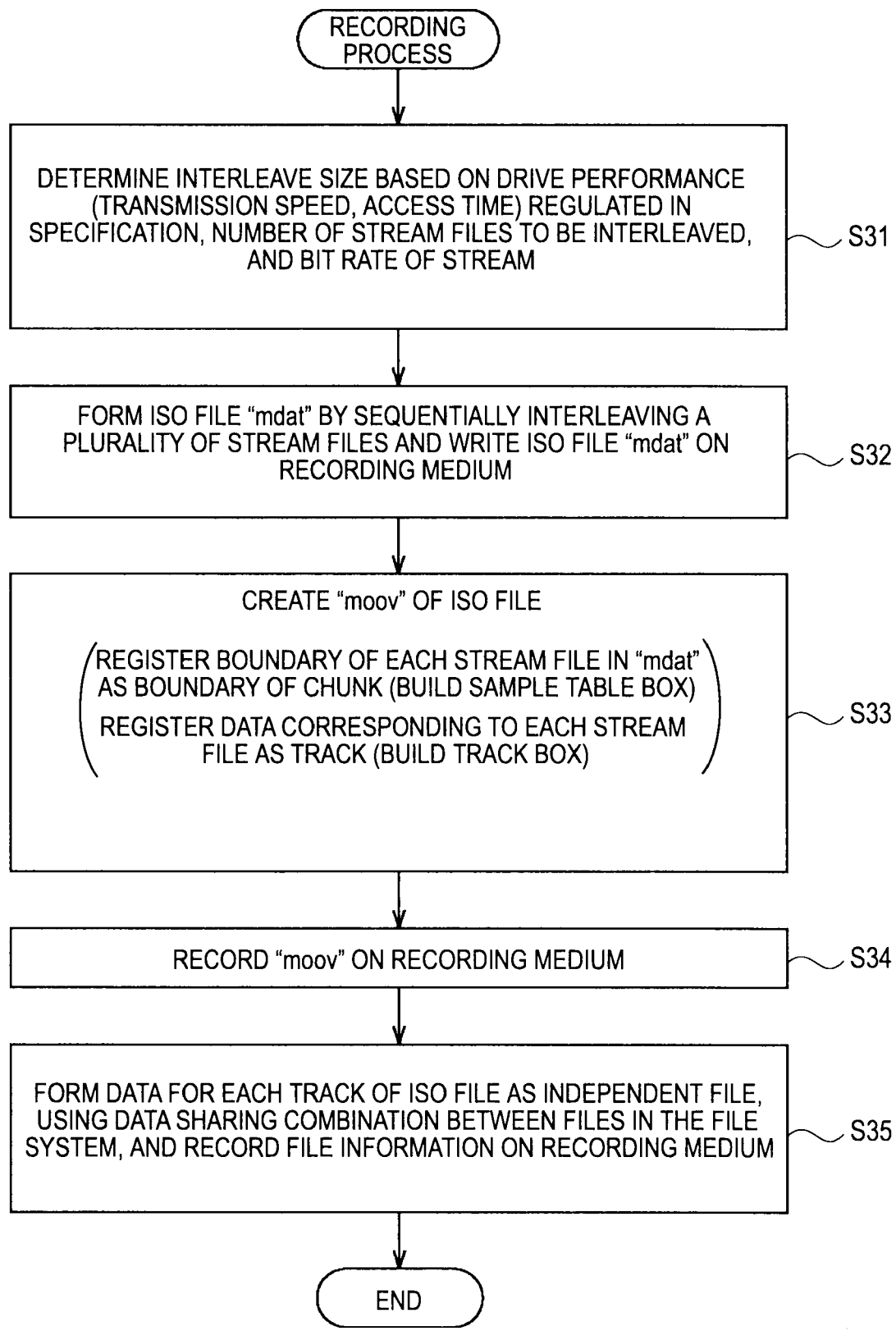
FIG. 22 is a flowchart illustrating a recording process.

FIG. 22 is a flowchart illustrating a process (recording process) performed by the recording apparatus in FIG. 21.

In step S31, the setting section 61 sets the interleave size on the basis of the performance of the drive regulated in the specification of the disc 21, the numbers of the files B and D which are the target files, the bit rates of the data streams of the files B and D which are the target files, and the like.

Further, the setting section 61 supplies the size information indicating the interleave size to the interleaver 62 and the data generating section 63, and then, the routine proceeds to step S32 from step S31.

In step S32, the interleaver 62 divides each of the data streams of the file B of the base image and the file D of the extended image into the interleave units of the interleave size indicated by the size information from the setting section 61.

Further, by interleaving the interleave units of each of the data streams of the file B of the base image and the file D of the extended image, the interleaver 62 generates the interleaved data which is physically and continuously recorded on the disc 21.

Further, the interleaver 62 supplies the interleaved data to the recording control section 64.

The recording control section 64 forms the box "mdat" (FIG. 10) of the file C which is the ISO file, which includes the interleaved data from the interleaver 62. Further, the recording control section 64 controls the drive 65 to physically and continuously record the box "mdat" of the file C on the disc 21, and then the routine proceeds to step S33 from step S32.

In step S33, the data generating section 63 forms (generates) the box "moov" of the file C which is the ISO file.

That is, the data generating section 63 generates the position information indicating the relative position from the header of the interleaved data (file C which is the ISO file), of the interleave unit which form the chunk, using the interleave unit as the chunk of the file C which is the ISO file, from the interleave size represented by the size information supplied from the setting section 61.

Further, the data generating section 63 generates (builds) the box "stbl" (FIG. 13) which includes the box "stco" which is the position information.

Further, the data generating section 63 generates the box (hereinafter, referred to as "box for moov") which is necessary information required for generation of the box "moov" (FIG. 10) of the file C which is the ISO file, such as a box "trak" (track box) (FIG. 11) which includes the information of each track, using each of the interleave unit arrangement of the file B of the base image and the interleave unit arrangement of the file D of the extended image as one track.

Further, the data generating section 63 generates the box "moov" of the file C using the "box for moov" such as a box "stbl" or "trak", and supplies the result to the recording control section 64. Then, the routine proceeds to step S34 from step S33.

In step S34, the recording control section 64 controls the drive 65 to record the box "moov" of the file C on the disc 21. Further, the recording control section 64 records file information relating to the file, on the file C including the boxes "moov" and "mdat" of the file C recorded on the disc 21 (for example, the file name, sector information on the disc 21 on which the file is recorded, or the like), and then the routine proceeds to step S35 from step S34.

In step S35, the recording control section 64 records, on the disc 21, the file B of which the content is the arrangement of the interleave units of the base image and the file D of which the content is the arrangement of the interleave units of the extended image, among the interleaved data which is the content of the file C recorded on the disc 21 using the link function of the file system.

That is, by controlling the drive 65, the recording control section 64 records, on the disc 21, information on the file B of which the content is the arrangement of the interleave units of the base image and the file D of which the content is the arrangement of the interleave units of the extended image, among the interleaved data which is the content of the file C recorded on the disc 21.

In FIG. 22, the file C of which the content is the interleaved data is recorded on the disc 21, and then the file B of which the content is the arrangement of the interleave units of the base image and the file D of which the content is the arrangement of the interleave units of the extended image, among the interleaved data which is the content of the file C recorded on the disc 21 using the link function of the file system, are recorded on the disc 21. However, contrarily, the file B of which the content is the arrangement of the interleave units of the base image and the file D of which the content is the arrangement of the interleave units of the extended image, among the interleaved data which is the content of the file C recorded on the disc 21, may be recorded on the disc 21, and then, the file C of which the content is the interleaved data which forms the content of the files B and D recorded on the disc 21 may be recorded on the disc 21, using the link function of the file system.

As described above, the recording apparatus (FIG. 21) generates the interleaved data which is physically and continuously recorded on the disc 21 by dividing each of the data streams of the files B and D which are the m2ts files recorded on the disc 21 into the interleaving units and by interleaving the interleaving units. Further, the recording apparatus generates the box "moov" including the box "stco" (FIG. 13) which is the position information indicating the position on the interleaved data, of the interleave unit which forms the chunk, using the interleave unit as the chunk of the ISO base media file format. Further, the recording apparatus physically and continuously records the interleaved data on the disc 21 using the interleaved data and the box "moov" as the file C which is one file of the ISO base media file format, and records the box "moov" on the disc 21.

Accordingly, in the reproduction apparatus 22 (FIG. 17), it is possible to continuously read the interleaved data which is the content of the file C which is one file from the disc 21 by the issue of the reading command of only the file C. That is, consequently, it is possible to simultaneously and rapidly read the data streams of the files B and D which form the interleaved data from the disc 21.

Further, the reproduction apparatus 22 obtains the box "moov" including the box "stco" (FIG. 13) which is the position information on the interleave units from the disc 21. Further, the reproduction apparatus 22 de-interleaves the interleaved data into the interleave units of each of the data streams of the files B and D on the basis of the position information, and then re-forms each of the data streams of the files B and D.

Accordingly, it is possible to obtain the data stream of the file B of the base image and the data stream of the file D of the extended image from the interleaved data which is rapidly read from the disc 21.

In the file C which is the ISO file, since the interleave units form the chunks of the ISO base media file format, the position information on the interleave units can be managed by the box "stco" (FIG. 13) of the ISO base media file format.

Accordingly, it is not necessary to define a new separate data structure (syntax) in order to manage the position information on the interleave units.

Here, the box "moov" which is the database of the file C which is the ISO file can be read according to a file reading command of Java (registered trademark).

Further, when the file C is copied to a different disc from the disc 21, it is necessary to physically and continuously record the interleaved data of the content of the file C on a different disc.

When the files B and C are respectively copied to a different disc from the disc 21, all of the content of the files B and C include the interleaved data, but information on the interleave unit arrangement is lost (the interleave units of the file B and the interleave units of the file D are interleaved).

[Description of Computer to which the Present Invention is Applied]

The series of processes as described above may be performed by hardware or software. When the series of processes is performed by software, a program which forms the software is installed to a general-purpose computer or the like.

Figure 23:
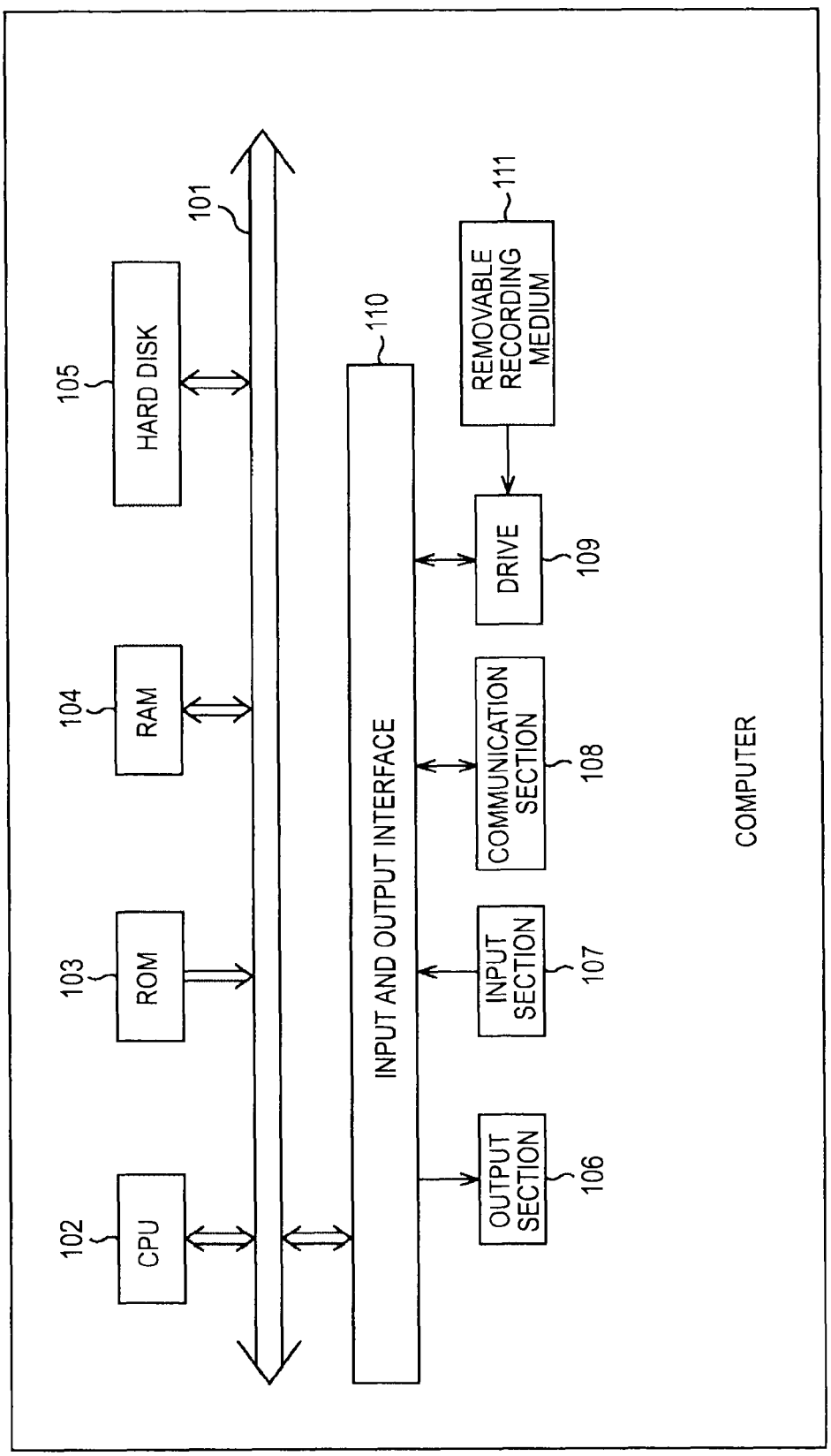
FIG. 23 is a block diagram illustrating a configuration example of an embodiment of a computer to which the present invention is applied.

Thus, FIG. 23 illustrates a configuration example of an embodiment of the computer in which the program which executes the above-described series of processes is installed.

The program may be recorded in advance on a hard disk 105 or a ROM 103 which is a recording medium installed in the computer.

Alternatively, the program may be stored (recorded) on a removable recording medium 111. Such a removable recording medium 111 may be provided as so-called "package software". Here, the removable recording medium 111 includes a flexible disc, CD-ROM (Compact Disc Read Only Memory), MO (Magneto Optical) disc, DVD (Digital Versatile Disc), magnetic disk, semiconductor memory and the like, for example.

The program is installed in the computer from the above-described removable recording medium 111, but alternatively may be downloaded to the computer through a communication network or a broadcasting network and then may be installed on a hard disk 105 built into the computer. That is, the program may be transmitted to the computer from a download site in a wireless manner through a satellite for digital satellite broadcasting, or may be transmitted to the computer in a wired manner through a network such as a LAN (Local Area Network) or the Internet, for example.

The computer is installed with a CPU (Central Processing Unit) 102 therein, and an input and output interface 110 is connected to the CPU 102 through a bus 101.

If an instruction is input through the input and output interface 110 by a user operation of an input section 107 or the like, the CPU 102 executes the program stored in the ROM (Read Only Memory) 103 according to the instruction. Alternatively, the CPU 102 loads the program stored in the hard disk 105 to a RAM (Random Access Memory) 104 for execution.

Thus, the CPU 102 performs the process according to the above-described flowchart or the process performed by the configuration of the above-described block diagram. Further, the CPU 102 outputs the process result from an output section 106 and transmits the process result from the communication section 108 through the input and output interface 110, or records the process result on the hard disk 105, for example, as necessary.

The input section 107 includes a keyboard, a mouse, a microphone or the like. Further, the output section 106 includes an LCD (Liquid Crystal Display), a speaker or the like.

Here, in the present description, the process performed by the computer according to the program is not necessarily performed in a time series manner according to the order disclosed in the flowchart. That is, the process performed by the computer according to the program includes processes which are performed in parallel or individually (for example, parallel process, or process according to objects).

Further, the program may be processed by a single computer (processor) or may be dispersedly processed by a plurality of computers. Further, the program may be transmitted to a distant computer for execution.

The embodiments of the present invention are not limited to the above-described embodiments, and a variety of modifications may be made in a range without departing from the spirit of the invention.

That is, in this embodiment, the disc 21 which is a BD is employed as the recording medium on which the interleaved data is recorded, but as the recording medium on which the interleaved data is recorded, a disc-shaped recording medium other than a BD or a tape-like recording medium may be employed.

Further, in the present embodiment, the data streams of the two files of the file B of the base image and the file D of the extended image which form the stereoscopic image are the interleave targets, but the interleaving may be performed by using the data streams of three or more files as the targets.

Further, as the interleave targets, for example, it is possible to employ data streams of arbitrary media files such as captions, other than images.

Further, in the present embodiment, the data stream of the base image is shared by the files B and C and the data stream of the extended image is shared by the files D and C, using the link function of the file system, but the files B and D and the file C may be recorded on the disc 21 without such sharing (without using the link function).

That is, the data stream of the base image, the data stream of the extended image and the interleaved data including the interleave units of each of the data streams of the base image and the extended image are all recorded on the disc 21, and the file B may be used as the file of which the content is the data stream of the base image, the file D may be used as the file of which the content is the data stream of the extended image, and the file C may be used as the file of which the content is the interleaved data.

In this case, the set of the data stream of the base image which is the content of the file B and the data stream of the extended image which is the content of the file D, and the interleaved data which is the content of the file C have overlapped content, which thereby burdens the capacity of the disc 21.

REFERENCE SIGNS LIST

11 DISC
13 DRIVE
13 SIGNAL PROCESSING SECTION
14 SWITCH
$14_1$, $14_2$ TERMINAL
$15_1$, $15_2$ BUFFER
$16_1$, $16_2$ DE-PACKETIZER
21 DISC
22 REPRODUCTION APPARATUS
23 STEREOSCOPIC VISION DISPLAY APPARATUS
31 SYSTEM CONTROLLER
32 FILE SYSTEM
33 BUFFER
34 DE-INTERLEAVER
$35_1$, $35_2$ DECODER
41 READING CONTROL SECTION
42 OBTAINING SECTION
43 STORING SECTION
44 DE-INTERLEAVING CONTROL SECTION
61 SETTING SECTION
62 INTERLEAVER
63 DATA GENERATING SECTION
64 RECORDING CONTROL SECTION
65 DRIVE
101 BUS
102 CPU
103 ROM
104 RAM
105 HARD DISK
106 OUTPUT SECTION
107 INPUT SECTION
108 COMMUNICATION SECTION
109 DRIVE
110 INPUT AND OUTPUT INTERFACE
111 REMOVABLE RECORDING MEDIUM

The invention claimed is:

1. A reproduction apparatus comprising:
circuitry configured to
perform reading control for continuously reading interleaved data from a recording medium which records a file of an ISO base media file format, the file including the interleaved data which is obtained by dividing each data stream of a plurality of files recorded on the recording medium into interleave units which are fragments of the data stream of a predetermined length and by interleaving the interleave units of the data streams of the plurality of files to generate the interleaved data which is physically and continuously recorded on the recording medium so that the interleave units of the plurality of files alternate in the interleaved data, and position information which indicates, using the interleave unit as a chunk of the ISO base media file format, the position of the interleave unit which forms the chunk, on the interleaved data;

obtain the position information from the recording medium; and perform de-interleaving control for de-interleaving the interleaved data into the interleave units of each of the data streams of the plurality of files on the basis of the position information and re-forming each of the data streams of the plurality of files which includes the interleave units.

2. The reproduction apparatus according to claim 1, wherein the data streams of the plurality of files are image data streams for stereoscopic vision.

3. The reproduction apparatus according to claim 2, wherein the data streams of the plurality of files are data streams of two images of a left eye image observed by the left eye and a right eye image observed by the right eye.

4. The reproduction apparatus according to claim 1, wherein the data streams form one track of the ISO base media file format.

5. A reproduction method comprising the steps of:

performing a reading control for continuously reading interleaved data from a recording medium which records a file of an ISO base media file format, the file including the interleaved data which is obtained by dividing each data stream of a plurality of files recorded on the recording medium into interleave units which are fragments of the data stream of a predetermined length and by interleaving the interleave units of the data streams of the plurality of files to generate the interleaved data which is physically and continuously recorded on the recording medium so that the interleave units of the plurality of files alternate in the interleaved data, and position information which indicates, using the interleave unit as a chunk of the ISO base media file format, the position, on the interleaved data, of the interleave unit which forms the chunk;

obtaining the position information from the recording medium; and performing a de-interleaving control for de-interleaving the interleaved data into the interleave units of each of the data streams of the plurality of files on the basis of the position information and re-forming each of the data streams of the plurality of files which includes the interleave units.

6. A non-transitory computer-readable medium encoded with computer readable instructions that when executed by a computer cause the computer to perform a method:

performing a reading control for continuously reading interleaved data from a recording medium which records a file of an ISO base media file format, the file including the interleaved data which is obtained by dividing each data stream of a plurality of files recorded on the recording medium into interleave units which are fragments of the data stream of a predetermined length and by interleaving the interleave units of the data streams of the plurality of files to generate the interleave data which is physically and continuously recorded on the recording medium so that the interleaved units of the plurality of files alternate in the interleaved data, and position information which indicates, using the interleave unit as a chunk of the ISO base media file format, the position of the interleave unit which forms the chunk, on the interleaved data;

obtaining the position information from the recording medium; and performing a de-interleaving control for de-interleaving the interleaved data into the interleave units of each of the data streams of the plurality of files on the basis of the position information and re-forming each of the data streams of the plurality of files which includes the interleave units.

7. A recording apparatus comprising:

circuitry configured to generate interleaved data which is physically and continuously recorded on a recording medium by dividing each data stream of a plurality of files recorded on the recording medium into interleave units which are fragments of the data stream of a predetermined length and by interleaving the interleave units of the data streams of the plurality of files to generate the interleaved data so that the interleave units of the plurality of files alternate in the interleaved data;

generate position information which indicates, using the interleave unit as a chunk of the ISO base media file format, the position of the interleave unit which forms the chunk, on the interleaved data; and perform a recording control for physically and continuously recording the interleaved data on the recording medium using the interleaved data and the position information as one file of the ISO base media file format and for recording the position information on the recording medium.

8. The recording apparatus according to claim 7, wherein the data streams of the plurality of files are image data streams for stereoscopic vision.

9. The recording apparatus according to claim 8, wherein the data streams of the plurality of files are data streams of two images of a left eye image observed by the left eye and a right eye image observed by the right eye.

10. The recording apparatus according to claim 7, wherein the data streams form one track of the ISO base media file format.

11. A recording method comprising the steps of:

generating interleaved data which is physically and continuously recorded on a recording medium by dividing each data stream of a plurality of files recorded on the recording medium into interleave units which are fragments of the data stream of a predetermined length and by interleaving the interleave units of the data streams of the plurality of files to generate the interleaved data so that the interleave units of the plurality of files alternate in the interleaved data;

generating position information which indicates, using the interleave unit as a chunk of the ISO base media file format, the position of the interleave unit which forms the chunk, on the interleaved data; and performing a recording control for physically and continuously recording the interleaved data on the recording medium using the interleaved data and the position information as one file of the ISO base media file format and for recording the position information on the recording medium.

12. A non-transitory computer-readable medium encoded with computer-readable instructions thereon that when executed by a computer cause the computer to perform a method comprising:

generating interleaved data which is physically and continuously recorded on a recording medium by dividing each data stream of a plurality of files recorded on the recording medium into interleave units which are fragments of the data stream of a predetermined length and by interleaving the interleave units of the data streams of the plurality of files to generate the interleaved data so that the interleave units of the plurality of files alternate in the interleaved data;

generating position information which indicates, using the interleave unit as a chunk of the ISO base media file format, the position of the interleave unit which forms the chunk, on the interleaved data; and performing a recording control for physically and continuously recording the interleaved data on the recording medium using the interleaved data and the position information as one file of the ISO base media file format and for recording the position information on the recording medium.

13. A non-transitory computer-readable medium encoded with computer readable instructions thereon that cause a computer to reproduce data encoded thereon, the computer-readable medium including a data structure of a file of an ISO base media file format, the file comprising:

interleaved data which is obtained by dividing each data stream of a plurality of files recorded on the recording medium into interleave units which are fragments of the data stream of a predetermined length and by interleaving the interleave units of the data streams of the plurality of files to generate the interleave data which is physically and continuously recorded on the recording medium so that the interleaved units of the plurality of files alternate in the interleaved data; and position information which indicates, using the interleave unit as a chunk of the ISO base media file format, the position of the interleave unit which forms the chunk, on the interleaved data.

* * * * *